(12) United States Patent
Meyerson et al.

(10) Patent No.: US 11,250,314 B2
(45) Date of Patent: Feb. 15, 2022

(54) BEYOND SHARED HIERARCHIES: DEEP MULTITASK LEARNING THROUGH SOFT LAYER ORDERING

(71) Applicant: Cognizant Technology Solutions U.S. Corporation, College Station, TX (US)

(72) Inventors: Elliot Meyerson, San Francisco, CA (US); Risto Miikkulainen, Stanford, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 685 days.

(21) Appl. No.: 16/172,660

(22) Filed: Oct. 26, 2018

(65) Prior Publication Data
US 2019/0130257 A1    May 2, 2019

Related U.S. Application Data

(60) Provisional application No. 62/578,035, filed on Oct. 27, 2017.

(51) Int. Cl.
*G06N 3/04* (2006.01)
*G06N 3/08* (2006.01)

(52) U.S. Cl.
CPC ......... *G06N 3/0481* (2013.01); *G06N 3/0454* (2013.01); *G06N 3/084* (2013.01)

(58) Field of Classification Search
CPC ..... G06N 3/0481; G06N 3/0454; G06N 3/084
See application file for complete search history.

(56) References Cited

U.S. PATENT DOCUMENTS 5,140,530 A    8/1992  Guha et al.
5,761,381 A    6/1998  Arci et al.
(Continued)

FOREIGN PATENT DOCUMENTS

EP    0762294 A2    3/1997
EP    2422276       2/2012
(Continued)

OTHER PUBLICATIONS

Bilen et al. "Integrated Perception with Recurrent Multi-Task Neural Networks", NIPS, 2016, pp. 9.*
(Continued)

*Primary Examiner* — Li Wu Chang
(74) *Attorney, Agent, or Firm* — Dawn-Marie Bey; Bey & Cotropia PLLC

(57) ABSTRACT

The technology disclosed identifies parallel ordering of shared layers as a common assumption underlying existing deep multitask learning (MTL) approaches. This assumption restricts the kinds of shared structure that can be learned between tasks. The technology disclosed demonstrates how direct approaches to removing this assumption can ease the integration of information across plentiful and diverse tasks. The technology disclosed introduces soft ordering as a method for learning how to apply layers in different ways at different depths for different tasks, while simultaneously learning the layers themselves. Soft ordering outperforms parallel ordering methods as well as single-task learning across a suite of domains. Results show that deep MTL can be improved while generating a compact set of multipurpose functional primitives, thus aligning more closely with our understanding of complex real-world processes.

20 Claims, 9 Drawing Sheets

(56) References Cited

U.S. PATENT DOCUMENTS

| | | |
|---|---|---|
| 5,845,266 A | 12/1998 | Lupien et al. |
| 5,920,848 A | 7/1999 | Schutzer et al. |
| 5,930,780 A | 7/1999 | Hughes et al. |
| 6,240,399 B1 | 5/2001 | Frank et al. |
| 6,249,783 B1 | 6/2001 | Crone et al. |
| 7,013,344 B2 | 3/2006 | Megiddo |
| 7,246,075 B1 | 7/2007 | Testa |
| 7,370,013 B1 | 5/2008 | Aziz et al. |
| 7,444,309 B2 | 10/2008 | Branke et al. |
| 8,639,545 B2 | 1/2014 | Cases et al. |
| 8,768,811 B2 | 7/2014 | Hodjat et al. |
| 9,053,431 B1 | 6/2015 | Commons |
| 9,466,023 B1 | 10/2016 | Shahrzad et al. |
| 9,785,886 B1 | 10/2017 | Andoni |
| 2002/0019844 A1 | 2/2002 | Kurowski et al. |
| 2003/0014379 A1 | 1/2003 | Saias et al. |
| 2003/0158887 A1 | 8/2003 | Megiddo |
| 2004/0143559 A1 | 7/2004 | Ayala |
| 2004/0210545 A1 | 10/2004 | Branke et al. |
| 2004/0254901 A1 | 12/2004 | Bonabeau et al. |
| 2005/0033672 A1 | 2/2005 | Lasry et al. |
| 2005/0136480 A1 | 6/2005 | Bralnnachuri et al. |
| 2005/0187848 A1 | 8/2005 | Bonissone et al. |
| 2005/0197875 A1 | 9/2005 | Kauffman |
| 2005/0198103 A1 | 9/2005 | Ching |
| 2006/0218107 A1 | 9/2006 | Young |
| 2007/0100907 A1 | 5/2007 | Bayer |
| 2007/0143198 A1 | 6/2007 | Brandes et al. |
| 2007/0143759 A1 | 6/2007 | Ozgur et al. |
| 2007/0150435 A1 | 6/2007 | Murakawa et al. |
| 2007/0185990 A1 | 8/2007 | Ono et al. |
| 2008/0071588 A1 | 3/2008 | Eder |
| 2008/0228644 A1 | 9/2008 | Birkestrand et al. |
| 2009/0125370 A1 | 5/2009 | Blondeau et al. |
| 2009/0327178 A1 | 12/2009 | Jacobson |
| 2010/0030720 A1 | 2/2010 | Stephens |
| 2010/0111991 A1 | 5/2010 | Raitano et al. |
| 2010/0182935 A1 | 7/2010 | David |
| 2010/0256795 A1 | 10/2010 | McLaughlin et al. |
| 2010/0257228 A1 | 10/2010 | Staggs et al. |
| 2010/0257605 A1 | 10/2010 | McLaughlin et al. |
| 2010/0274742 A1 | 10/2010 | Hodjat et al. |
| 2012/0239592 A1 | 9/2012 | Esbensen |
| 2012/0313798 A1 | 12/2012 | Markram |
| 2013/0311412 A1 | 11/2013 | Lazar et al. |
| 2014/0011982 A1 | 1/2014 | Marasco et al. |
| 2015/0288573 A1 | 10/2015 | Baughman et al. |
| 2016/0048753 A1 | 2/2016 | Sussillo et al. |
| 2016/0063359 A1 | 3/2016 | Szegedy et al. |
| 2016/0364522 A1 | 12/2016 | Frey et al. |
| 2017/0001093 A1 | 4/2017 | Li et al. |
| 2017/0148433 A1* | 5/2017 | Catanzaro ............ G10L 15/183 |
| 2017/0193367 A1 | 7/2017 | Miikkulainen et al. |
| 2017/0213156 A1 | 7/2017 | Hammond et al. |
| 2017/0323636 A1 | 11/2017 | Xiao et al. |
| 2018/0053092 A1 | 2/2018 | Hajizadeh |
| 2018/0114115 A1 | 4/2018 | Liang et al. |
| 2018/0114116 A1 | 4/2018 | Liang et al. |
| 2018/0240041 A1 | 8/2018 | Koch et al. |
| 2019/0065954 A1* | 2/2019 | Bittner, Jr. ............ G06F 9/3885 |

FOREIGN PATENT DOCUMENTS

| | | |
|---|---|---|
| EP | 2422278 | 2/2012 |
| JP | 08-110804 | 4/1996 |
| JP | H09114797 | 5/1997 |
| JP | 2001325041 | 11/2001 |
| JP | 2003044665 | 2/2003 |
| JP | 2004240671 | 8/2004 |
| JP | 2004302741 | 10/2004 |
| JP | 2005190372 | 6/2007 |
| JP | 2007207173 | 8/2007 |
| JP | 2007522547 | 8/2007 |
| JP | 2008129984 | 6/2008 |
| WO | WO 2005/073854 | 8/2005 |
| WO | WO 2010/120440 | 10/2010 |

OTHER PUBLICATIONS

Fernando et al., "Pathnet: Evolution channels gradient descent in super neural networks," arXiv preprint arXiv:1701.08734 (2017), 16 pages.

Yang et al., "Deep multi-task representation learning: A tensor factorisation approach," arXiv preprint arXiv:1605.06391 (2016), 12 pages.

Shazeer et al., "Outrageously large neural networks: The sparsely-gated mixture-of-experts layer," arXiv preprint arXiv:1701.06538 (2017), 19 pages.

Misra et al., "Cross-stitch networks for multi-task learning," In Proceedings of the IEEE Conference on Computer Vision and Pattern Recognition, pp. 3994-4003. 2016.

International Search Report and Written Opinion for PCT App. No. PCT/US19/61198, dated Mar. 11, 2020, 15 pp.

Moriarty, David E., et al., "Forming neural networks through efficient and adaptive coevolution," Evolutionary Computation 5.4, 1997.

Lee, Chi-Ho, et al., "Evolutionary ordered neural network with a linked-list encoding scheme," Proceedings of IEEE International Conference on Evolutionary Computation, IEEE, 1996.

Bredeche, Nicolas, et al., "On-line, on-board evolution of robot controllers," International Conference on Artificial Evolution, Springer, Berlin, Heidelberg, 2009.

Utech, J., et al., "An evolutionary algorithm for drawing directed graphs," Proc. of the Int. Conf. on Imaging Science, Systems and Technology, 1998.

International Preliminary Report on Patentability for PCT App. No. PCT/US2019/061198, dated Nov. 18, 2020, 24 pp.

Li, Xiaodong, and Michael f{irley. 'The effects of varying population density in a fine-grained parallel genetic algcrithmi' Evolutionary Computation. 2002. CEC'02. Proceedings of the 2002 Congress on. vol. 2. IEEE. 2002.

Fidelis. Marcos Vinicius, Heitor S. Lopes, and Alex A. Freitas. "Discovering comprehensible classification rules with a genetic algorithm." Evolutionary Computation. 2000. Proceedings of the 2000 Congress on. vol. 1. IEEE. 2000.

Dec. 23, 2008 International Search Report and Written Opinion for PCT/US2008/82876, 10 pp.

Koza. J.R, "Genetic Programming: On the Programming of Computers by Means of Natural Selection", Dec. 1992, MIT Press. pp. 1-609.

Nov. 26, 2012 Extended EP SR for EP 08847214 (GNFN 2110-3), 9 pp.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Tanev I et al., "Scalable architecture for parallel distributed implementation of genetic programming on network of workstations," J. Systems Architecture, vol. 47, Jul. 2001, pp. 557-572.

Streichert F., "Introduction to Evolutionary Algorithms," paper to be presented Apr. 4, 2002 at the Frankfurt MathFinance Workshop Mar. 30, 2002, Frankfurt, Germany, XP055038571, 22 pp. (retrieved from the Internet: URL: http://www.ra.cs.uni-tuebingen.de/mitarb/streiche/publications/Introduction to E volutionary Algorithms.pdf).

Poli R et al., "Genetic Programmig: An introductory Tutorial and a Survey of Techniques and Applications," Univ. Essex School of Computer Science and Eletronic Enineering Technical Report No. CES-475, Oct. 2007, 112 pp.

Jun. 16, 2011 Written Opinion from Singapore Patent Office in related Application SG 201003127-6, 9 pp.

Apr. 20, 2012 Exam Report for related application AU 2008323758, 2 pp.

(56) References Cited

OTHER PUBLICATIONS

Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, pp. 14-15.
JP 2010-533295, Office Action dated Apr. 16, 2013, 12 pages.
U.S. Appl. No. 14/014,063—Office Action dated May 7, 2014, 19 pages (GNFN 2410-18).
JP 2012-508663—Office Action dated Apr. 1, 2014, 6 pages (with English Translation).
JP 2012-508660—Office Action dated Apr. 1, 2014, 8 pages (with English Translation).
International Search Report dated Jun. 29, 2010 in PCT/US10/32841 (GNFN 2410-2).
M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, 2003, pp. 61-66.
JE Bartlett II, et al., "Organizational Research: Determining Appropriate Sample Size in Survey Research," IT, Learning, and Performance Journal 19(1) 2001, 8pp.
JC Bongard, et al., "Guarding Against Premature Convergence while Accelerating Evolutionary Search," Proc. 12th annual conf. of Genetic and evolutionary computation, 20201, 8pp.
M Davarynejad, "Fuzzy Fitness Granulation in Evolutionary Algorithms for complex optimization," Master of Science Thesis, Ferdowsi Univ. of Mashhad, 2007, 30pp.
M Davarynejad et al., "A Novel General Framework for Evolutionary Optimization: Adaptive Fuzzy Fitness Granulation," CEC 2007, 6pp.
E Ducheyne et al., "Is Fitness Inheritance Useful for Real-World Applications?" Evolutionary Multi-Criterion Optimization, ser. LNCS 2631, 2003, pp. 31-42.
JM Fitzpatrick et al., "Genetic Algorithms in Noisy Environments," Machine Learning 3: 101-120, 1988.
A Gaspar-Cunha et al., "A Multi-Objective Evolutionary Algorithm Using Neural Networks to Approximate Fitness Evaluations," Int'l J. Computers, Systems and Signals, 6(1) 2005, pp. 18-36.
PS Georgilakis, "Genetic Algorithm Model for Profit Maximization of Generating Companies in Deregulated Electricity Markets," Applied Artificial Intelligence, 2009, 23:6, 538-552.
G Gopalakrishnan et al., "Optimal Sampling in a Noisy Genetic Algorithm for Risk-Based Remediation Design," Bridging the gap: meeting the world's water and environmental resources challenges, Proc. World Water Congress 2001, 8 pp.
H Juille, "Evolution of Non-Deterministic Incremental Algorithms as a New Approach for Search in State Spaces," Proc. 6th Int'l Conf. on Genetic Algorithms, 1995, 8pp.
A Kosorukoff, "Using incremental evaluation and adaptive choice of operators in a genetic algorithm," Proc. Genetic and Evolutionary Computation Conference, GECCO—2002, 7pp.
A Nelson, "Fitness functions in evolutionary robotics: A survey and analysis," Robotics and Autonomous Systems 57 (2009) 345-370.
S Remde, et al. "Evolution of Fitness Functions to Improve Heuristic Performance," LION 2007 II, LNCS 5313 pp. 206-219.
J Sacks, et al. "Design and Analysis of Computer Experiments," Statistical Science 4:4, 1989, 409-435.
M Salami, et al., "A fast evaluation strategy for evolutionary algorithms," Applied Soft Computing 2/3F (2003) 156-173.
J Torresen, "A Dynamic Fitness Function Applied to Improve the Generalisation when Evolving a Signal Processing Hardware Architecture," Proc. EvoWorkshops 2002, 267-299 (12 pp).
BA Whitehead, "Genetic Evolution of Radial Basis Function Coverage Using Orthogonal Niches," IEEE Transactions on Neural Networks, 7:6, (1996) 1525-28.
AS Wu et al., "An incremental fitness function for partitioning parallel taks," Proc. Genetic and Evolutionary Computation Conf. (2001) 8pp.
Supplementary European Search Report dated Oct. 12, 2012 in EP 10770288 (GNFN 2510-12 EP).
Supplementary European Search Report dated Oct. 9, 2012 in EP 10770287 (GNFN 2410-12 EP).
Lopez Haimes et al., "MRMOGA: parallel evolutionary multi-objective optimization using multiple resolutions," In: *Proceedings of IEEE Congress on Evolutionary Computation*, 2294-2301, 2005.
Castillo Tapia et al. Applications of multi-objective evolutionary algorithms in economics and finance: A survey. IEEE Congress on Evolutionary Computation 2007: 532-539.
Bui et al. "Local Models: An Approach to Distributed Multi-objective Optimization, and Computational Optimization and Applications," Computational Optimization and Application Journal, 2009, 42(1), 105-139.
Leon et al. Parallel Hypervolume-Guided Hyperheuristic for Adapting the Multi-objective Evolutionary Island Model. NICSO 2008: 261-272.
U.S. Appl. No. 13/895,238—Office Action dated Jan. 2, 2014, 17 pages (GNFN 2410-17).
Aug. 1, 2012 Office Action in U.S. Appl. No. 13/443,546 (GNFN 2110-17), 12 pp.
Jun. 22, 2011 Office Action in U.S. Appl. No. 12/267,287 (GNFN 2110-1), 16 pp.
Jul. 27, 2012 Final Office Action in U.S. Appl. No. 12/267,287 (GNFN 2110-1), 14 pp.
AU 2010241594—Examination Report dated Oct. 8, 2013, 3 pages.
AU 2010241597—Examination Report dated Nov. 4, 2013, 4 pages.
Myers, R.H. and Montgomery, D.C., "Response Surface Methodology: Process and Product Optimization Using Designed Experiments," New York: John Wiley and Sons, Inc., 1995, pp. 1-700.
Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, 2004, pp. 421-424.
International Search Report dated Jul. 2, 2010 in PCT/US10/32847 (GNFN 2510-2).
U.S. Appl. No. 15/794,913—Non-Provisional Application filed Oct. 26, 2017, 73 pages (GNFN 3307-2).
Stanley, Kenneth O., et al., "Real-Time Evolution of Neural Networks in the Nero Video Game," AAAI, vol. 6, 2006, 4 pp.
Scott, E. O., et al., "Understanding Simple Asynchronous Evolutionary Algorithms," Jan. 17-20, 2015, 15 pp.
Kenneth O. Stanley and Risto Miikkulainen, "Evolving Neural Networks Through Augmenting Topologies," Evolutionary Computation, 10(2):99-127, 2002.
International Search Report and Written Opinion for PCT Application No. PCT/US18/64428, dated Mar. 26, 2019, 12 pp.
International Search Report and Written Opinion for Application No. PCT/US2018/064520, dated Mar. 4, 2019, 8 pp.
Xu, et al., "Inference of Genetic Regulatory Networks With Recurrent Neural Network Models Using Particle Swarm Optimization," Missouri University of Science and Technology, Oct. 2017 [retrieved on Feb. 14, 2019], Retrieved from the Internet: http://scholarsmine.mst.edu/cgi/viewcontent_cgi?article=1751&context=ele_comeng_facwork.
Garcia-Pedrajas, et al., "Cooperative Coevolution of Artificial Neural Network Ensembles For Pattern Classification," IEEE Transactions on Evolutionary Computation, vol. 9, No. 3, Jun. 3, 2005.
Snoek, J., et al., "Scalable Bayesian Optimization Using Deep Neural Networks," arXiv: 1502.05700v2, Jul. 13, 2015.
James Bradbury, et al., "Quasi-Recurrent Neural Networks," arXiv: 1611.01576v2, Nov. 21, 2016, 11 pp., Retrieved From the Internet: https://arxiv.org/pdf/1611.01576.pdf?fbclid=1wAR3hreOvBGmJZe54-631X49XedcbsQoDYIRu87BcCHEBf_vMKF8FDKK_7Nw.
Yin, et al., "ABCNN: Attention-Based Convolutional Neural Network for Modeling Sentence Pairs," Transactions of the Association for Computational Linguistics, vol. 4, pp. 259-272, 2016, Retrieved on Aug. 4, 2019, Retrieved From the Internet: https://www.mitpressjournals.org/doi/pdf/10.1162/tacl_a_00097.
International Search Report and Written Opinion for PCT Application No. PCT/US2019/017175, dated Jun. 5, 2019, 10 pp.
E. Meyerson and R. Miikkulainen, "Pseudo-Task Augmentation: From Deep Multitask Learning to Intratask Sharing and Back," ICML, 2018.
J. Z. Liang, et al.., "Evolutionary Architecture Search For Deep Multitask Networks," GECCO, 2018.

(56) References Cited

OTHER PUBLICATIONS

E. Meyerson and R. Miikkulainen, "Beyond Shared Hierarchies: Deep Multitask Learning Through Soft Layer Ordering," ICLR, 2018.
R. Miikkulainen, et al., "Evolving Deep Neural Networks," arXiv preprint arXiv: 1703.00548, 2017.

* cited by examiner

BEYOND SHARED HIERARCHIES: DEEP MULTITASK LEARNING THROUGH SOFT LAYER ORDERING

PRIORITY APPLICATION

This application claims priority to or the benefit of U.S. Provisional Patent Application No. 62/578,035, titled "DEEP MULTITASK LEARNING THROUGH SOFT LAYER ORDERING," filed on Oct. 27, 2017. The provisional application is hereby incorporated by reference for all purposes as if fully set forth herein.

INCORPORATIONS

The following materials are hereby incorporated by reference as if fully set forth herein:

U.S. Provisional Patent Application No. 62/684,125, titled "PSEUDO-TASK AUGMENTATION: FROM DEEP MULTITASK LEARNING TO INTRATASK SHARING AND BACK", filed on Jun. 12, 2018.

U.S. Provisional Patent Application No. 62/628,248, titled "PSEUDO-TASK AUGMENTATION: FROM DEEP MULTITASK LEARNING TO INTRATASK SHARING AND BACK", filed on Feb. 8, 2018.

E. Meyerson and R. Miikkulainen. 2018. Pseudo-Task Augmentation: From Deep Multitask Learning to Intratask Sharing and Back. ICML (2018);

J. Z. Liang, E. Meyerson, and R. Miikkulainen. 2018. Evolutionary Architecture Search For Deep Multitask Networks. GECCO (2018);

E. Meyerson and R. Miikkulainen. 2018. Beyond Shared Hierarchies: Deep Multitask Learning through Soft Layer Ordering. ICLR (2018);

U.S. Provisional Patent Application No. 62/578,035, titled "DEEP MULTITASK LEARNING THROUGH SOFT LAYER ORDERING", filed on Oct. 27, 2017;

R. Miikkulainen, J. Liang, E. Meyerson, et al. 2017. Evolving deep neural networks. arXiv preprint arXiv: 1703.00548 (2017);

U.S. Nonprovisional patent application Ser. No. 15/794,905, titled "EVOLUTION OF DEEP NEURAL NETWORK STRUCTURES", filed on Oct. 26, 2017; and U.S. Nonprovisional patent application Ser. No. 15/794,913, titled "COOPERATIVE EVOLUTION OF DEEP NEURAL NETWORK STRUCTURES", filed on Oct. 26, 2017.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as convolutional neural networks (CNNs) and fully-connected neural networks (FCNNs) for analyzing data.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In multitask learning (MTL) (Caruana, 1998), auxiliary data sets are harnessed to improve overall performance by exploiting regularities present across tasks. As deep learning has yielded state-of-the-art systems across a range of domains, there has been increased focus on developing deep MTL techniques. Such techniques have been applied across settings such as vision (Bilen and Vedaldi, 2016; 2017; Jou and Chang, 2016; Lu et al., 2017; Misra et al., 2016; Ranjan et al., 2016; Yang and Hospedales, 2017; Zhang et al., 2014), natural language (Collobert and Weston, 2008; Dong et al., 2015; Hashimoto et al., 2016; Liu et al., 2015a; Luong et al., 2016), speech (Huang et al., 2013; 2015; Seltzer and Droppo, 2013; Wu et al., 2015), and reinforcement learning (Devin et al., 2016; Fernando et al., 2017; Jaderberg et al., 2017; Rusu et al., 2016). Although they improve performance over single-task learning in these settings, these approaches have generally been constrained to joint training of relatively few and/or closely-related tasks.

On the other hand, from a perspective of Kolmogorov complexity, "transfer should always be useful"; any pair of distributions underlying a pair of tasks must have something in common (Mahmud, 2009; Mahmud and Ray, 2008). In principle, even tasks that are "superficially unrelated" such as those in vision and NLP can benefit from sharing (even without an adaptor task, such as image captioning). In other words, for a sufficiently expressive class of models, the inductive bias of requiring a model to fit multiple tasks simultaneously should encourage learning to converge to more realistic representations. The expressivity and success of deep models suggest they are ideal candidates for improvement via MTL. So, why have existing approaches to deep MTL been so restricted in scope?

MTL is based on the assumption that learned transformations can be shared across tasks. The technology disclosed identifies an additional implicit assumption underlying existing approaches to deep MTL: this sharing takes place through parallel ordering of layers. That is, sharing between tasks occurs only at aligned levels (layers) in the feature hierarchy implied by the model architecture. This constraint limits the kind of sharing that can occur between tasks. It requires subsequences of task feature hierarchies to match, which can be difficult to establish as tasks become plentiful and diverse.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
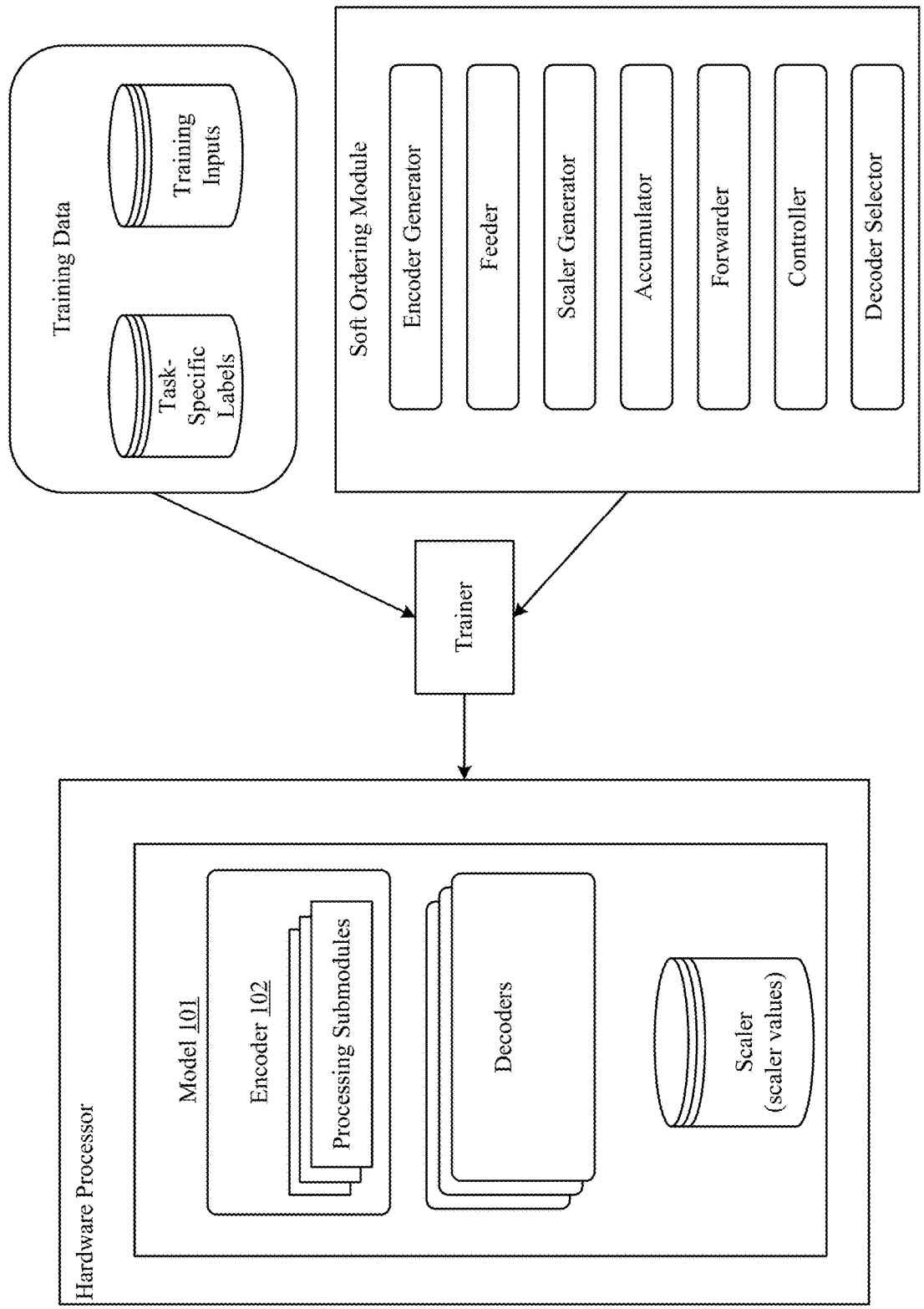
FIG. 1 is a block diagram that shows various aspects of the technology disclosed, including a model with an encoder and numerous decoders, training data, a trainer, and an initializer.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein can be applied to other implementations and applications without departing from the spirit and scope of the technology disclosed. Thus, the technology disclosed is not intended to be limited to the implementations shown, but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) can be implemented in a single piece of hardware (e.g., a general purpose signal processor or a block of random access memory, hard disk, or the like) or multiple pieces of hardware. Similarly, the programs can be stand-alone programs, can be incorporated as subroutines in an operating system, can be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

1. Introduction

The technology disclosed investigates whether parallel ordering of layers is necessary for deep MTL. It introduces alternative methods that make deep MTL more flexible. The following discussion is organized as follows. First, existing approaches are reviewed in the context of their reliance on parallel ordering. Then, as a foil to parallel ordering, permuted ordering is introduced, in which shared layers are applied in different orders for different tasks. The increased ability of permuted ordering to support integration of information across tasks is analyzed, and the results are used to develop a soft ordering approach to deep MTL.

The technology disclosed presents a joint model, which learns how to apply shared layers in different ways at different depths for different tasks, as it simultaneously learns the parameters of the layers themselves. In a suite of experiments, soft ordering is shown to improve performance over single-task learning as well as over fixed order deep MTL methods.

Importantly, soft ordering is not simply a technical improvement, but a new way of thinking about deep MTL. Learning a different soft ordering of layers for each task amounts to discovering a set of generalizable modules that are assembled in different ways for different tasks. This perspective points to future approaches that train a collection of layers on a set of training tasks, which can then be assembled in novel ways for future unseen tasks. Some of the most striking structural regularities observed in the natural, technological and sociological worlds are those that are repeatedly observed across settings and scales; they are ubiquitous and universal. By forcing shared transformations to occur at matching depths in hierarchical feature extraction, deep MTL falls short of capturing this sort of functional regularity. Soft ordering is thus a step towards enabling deep MTL to realize the diverse array of structural regularities found across complex tasks drawn from the real world.

2. Parallel Ordering of Layers in Deep Multitask Learning (MTL)

This section presents a high-level classification of deep MTL approaches and exposes the reliance of these approaches on the parallel ordering assumption.

2.1 A Classification of Approaches to Deep Multitask Learning (MTL)

Figure 2:
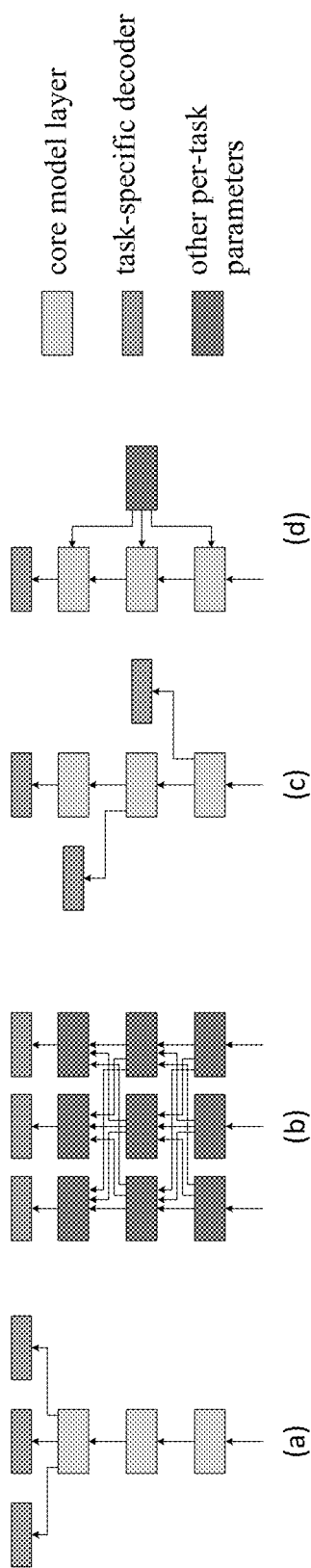
FIGS. 2(a)-(d) show various classes of deep multitask learning (MTL) architectures.

Designing a deep MTL system requires answering the key question: How should learned parameters be shared across tasks? The landscape of deep MTL approaches can be organized based on how they answer this question at the joint network architecture level. FIGS. 2(a)-(d) show various classes of deep multitask learning (MTL) architectures. In FIG. 2, (a) shows classical approaches which add a task-specific decoder to the output of the core single-task model for each task. In FIG. 2, (b) shows column based approaches which include a network column for each task and define a mechanism for sharing between columns. In FIG. 2, (c) shows supervision at custom depths which add output decoders at depths based on a task hierarchy. In FIG. 2, (d) shows universal representations which adapt each layer with a small number of task-specific scaling parameters. Underlying each of these approaches is the assumption of parallel ordering of shared layers. Also, each one requires aligned sequences of feature extractors across tasks.

2.1(a) Classical Approaches

Neural network MTL was first introduced in the case of shallow networks (Caruana, 1998), before deep networks were prevalent. The key idea was to add output neurons to predict auxiliary labels for related tasks, which would act as regularizers for the hidden representation. Many deep learning extensions remain close in nature to this approach, learning a shared representation at a high-level layer, followed by task-specific (i.e., unshared) decoders that extract labels for each task (Devin et al., 2016; Dong et al., 2015; Huang et al., 2013; 2015; Jaderberg et al., 2017; Liu et al., 2015a; Ranjan et al., 2016; Wu et al., 2015; Zhang et al., 2014) (FIG. 2(a)). This approach can be extended to task-specific input encoders (Devin et al., 2016; Luong et al., 2016), and the underlying single-task model can be adapted to ease task integration (Ranjan et al., 2016; Wu et al., 2015), but the core network is still shared in its entirety.

2.1(b) Column-Based Approaches

Column-based approaches (Jou and Chang, 2016; Misra et al., 2016; Rusu et al., 2016; Yang and Hospedales, 2017), assign each task its own layer of task-specific parameters at each shared depth (FIG. 2(b)). They then define a mechanism for sharing parameters between tasks at each shared depth, e.g., by having a shared tensor factor across tasks (Yang and Hospedales, 2017), or allowing some form of communication between columns (Jou and Chang, 2016; Misra et al., 2016; Rusu et al., 2016). Observations of negative effects of sharing in column-based methods (Rusu et al., 2016) can be attributed to mismatches between the features required at the same depth between tasks that are too dissimilar.

2.1(c) Supervision at Custom Depths

There can be an intuitive hierarchy describing how a set of tasks are related. Several approaches integrate supervised feedback from each task at levels consistent with such a hierarchy (Hashimoto et al., 2016; Toshniwal et al., 2017; Zhang and Weiss, 2016) (FIG. 2(c)). This method can be sensitive to the design of the hierarchy (Toshniwal et al., 2017), and to which tasks are included therein (Hashimoto et al., 2016). One approach learns a task-relationship hierarchy during training (Lu et al., 2017), though learned parameters are still only shared across matching depths. Supervision at custom depths has also been extended to include explicit recurrence that reintegrates information from earlier predictions (Bilen and Vedaldi, 2016; Zamir et al., 2016). Although these recurrent methods still rely on pre-defined hierarchical relationships between tasks, they provide evidence of the potential of learning transformations that have a different function for different tasks at different depths, i.e., in this case, at different depths unrolled in time.

2.1(d) Universal Representations

One approach shares all core model parameters except batch normalization scaling factors (Bilen and Vedaldi, 2017) (FIG. 2(d)). When the number of classes is equal across tasks, even output layers can be shared, and the small number of task-specific parameters enables strong performance to be maintained. This method is applied to a diverse array of vision tasks, demonstrating the power of a small number of scaling parameters in adapting layer functionality for different tasks. This observation helps to motivate the method developed in Section 3.

2.2 The Parallel Ordering Assumption

A common interpretation of deep learning is that layers extract progressively higher level features at later depths (Lecun et al., 2015). A natural assumption then is that the learned transformations that extract these features are also tied to the depth at which they are learned. The core assumption motivating MTL is that regularities across tasks will result in learned transformations that can be leveraged to improve generalization. However, the methods reviewed above add the further assumption that subsequences of the feature hierarchy align across tasks and sharing between tasks occurs only at aligned depths (FIG. 2(a)-(d)); we call this the parallel ordering assumption.

Consider T tasks $t_1 \ldots t_T$ to be learned jointly, with each $t_i$ associated with a model $y_i = F_i(x_i)$. Suppose sharing across tasks occurs at D consecutive depths. Let $\varepsilon_i(D_i)$ be $t_i$'s task-specific encoder (decoder) to (from) the core sharable portion of the network from its inputs (to its outputs). Let $w_k^i$ be the layer of learned weights (e.g., affine or convolutional) for task i at shared depth k, with $\emptyset_k$ an optional nonlinearity. The parallel ordering assumption implies:

$$y_i = (D_i \circ \emptyset_D \circ W_D^i \circ \emptyset_{D-1} \circ W_{D-1}^i \circ \ldots \circ \emptyset_1 \circ W_1^i \circ \varepsilon_i)(x_i),$$
$$\text{with } W_k^i \approx W_k^j \forall (i,j,k) \qquad (1)$$

In Eq. 1 above, the approximate equality "≈" means that at each shared depth the applied weight tensors for each task are similar and compatible for sharing. For example, learned parameters can be shared across all $W_k^i$ for a given k, but not between $W_k^i$ and $W_l^j$ for any k≠l. For closely-related tasks, this assumption can be a reasonable constraint. However, as more tasks are added to a joint model, it can be more difficult for each layer to represent features of its given depth for all tasks. Furthermore, for very distant tasks, it can be unreasonable to expect that task feature hierarchies match up at all, even if the tasks are related intuitively. The conjecture explored here is that parallel ordering limits the potential of deep MTL by the strong constraint it enforces on the use of each layer.

3. Deep Multitask Learning with Soft Ordering of Layers

Now that parallel ordering has been identified as a constricting feature of deep MTL approaches, we test its necessity and use the resulting observations to develop more flexible methods.

3.1 A Foil for the Parallel Ordering Assumption: Permuting Shared Layers

Consider the most common deep MTL setting: hard-sharing of layers, where each layer in $\{W_k\}_{k=1}^D$ is shared in its entirety across all tasks. The baseline deep MTL model for each task $t_i$ is given by:

$$y_i = (D_i \circ \emptyset_D \circ W_D \circ \emptyset_{D-1} \circ W_{D-1} \circ \ldots \emptyset_1 \circ W_1 \circ \varepsilon_i)(x_i) \qquad (2)$$

Figure 3:
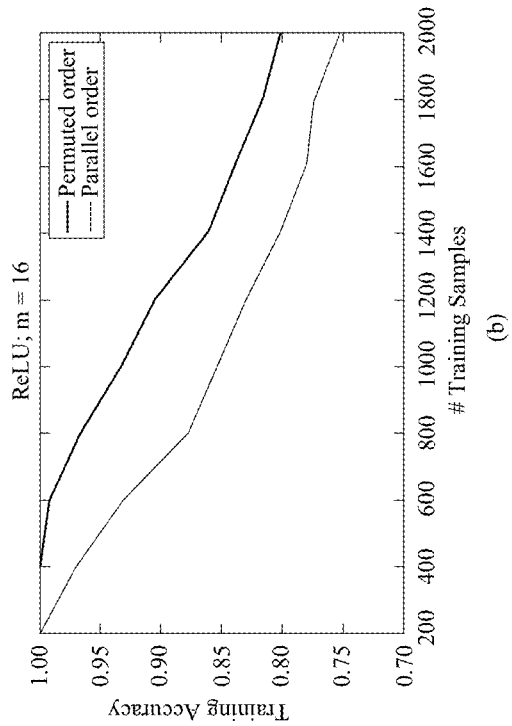
FIGS. 3(a)-(b) illustrate fitting of two random tasks.
Figure 3:
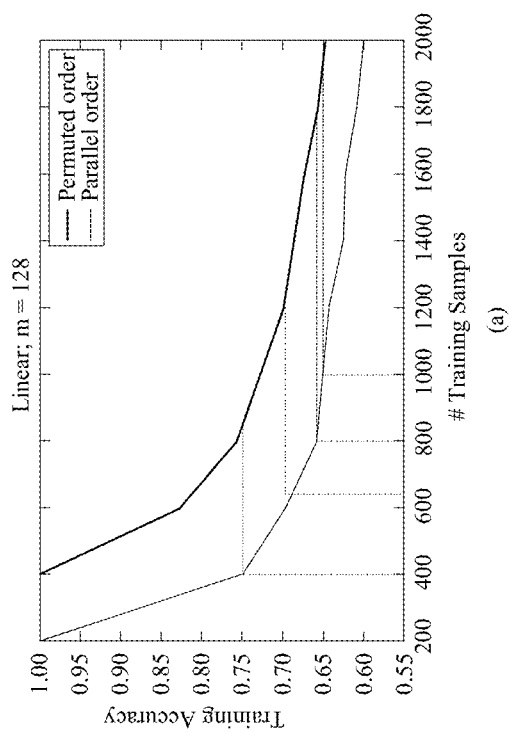

FIGS. 3(a)-(b) illustrate fitting of two random tasks. In FIG. 3, the dotted lines in (a) show that permuted ordering fits n samples as well as parallel fits n/2 for linear networks. For ReLU networks, in FIG. 3, (b) shows that permuted ordering enjoys a similar advantage. Thus, permuted ordering of shared layers eases integration of information across disparate tasks.

This setup satisfies the parallel ordering assumption. Consider now an alternative scheme, equivalent to the above, except with learned layers applied in different orders for different task. That is:

$$y_i = (D_i \circ \emptyset_D \circ W_{\sigma_i(D)} \circ \emptyset_{D-1} \circ W_{\sigma_i(D-1)} \circ \ldots \circ \emptyset_1 \circ W_{\sigma_i(1)} \circ \varepsilon_i)(x_i) \qquad (3)$$

In Eq. 3 above, $\sigma_i$ is a task-specific permutation of size D, and $\sigma_i$ is fixed before training. If there are sets of tasks for which joint training of the model defined by Eq. 3 achieves similar or improved performance over Eq. 2, then parallel ordering is not a necessary requirement for deep MTL. Of course, in this formulation, it is required that the $w_k$ can be applied in any order. See Section 6 for examples of possible generalizations.

Note that this multitask permuted ordering differs from an approach of training layers in multiple orders for a single task. The single-task case results in a model with increased commutativity between layers, a behavior that has also been observed in residual networks (Veit et al., 2016), whereas here the result is a set of layers that are assembled in different ways for different tasks.

3.2 The Increased Expressivity of Permuted Ordering

3.2(a) Fitting tasks of Random Patterns

Permuted ordering is evaluated by comparing it to parallel ordering on a set of tasks. Randomly generated tasks (similar to Kirkpatrick et al., 2017) are the most disparate possible tasks, in that they share minimal information, and thus help build intuition for how permuting layers could help integrate information in broad settings. The following experiments investigate how accurately a model can jointly fit two tasks of n samples. The data set for task $t_i$ is $$\{(x_{ij}, y_{ij})\}_{j=1}^{n}$$

with each $x_{ij}$ drawn uniformly from $[0,1]^m$, and each $y_{ij}$ drawn uniformly from $\{0, 1\}$. There are two shared learned affine layers $w_k: \mathbb{R}^m \to \mathbb{R}^m$. The models with permuted ordering (Eq. 3) are given by:

$$y_1 = (o \circ \emptyset \circ W_2 \circ \emptyset \circ W_1)(x_1) \text{ and } y_2 = (o \circ \emptyset \circ W_1 \circ \emptyset \circ W_2)(x_2) \quad (4)$$

In Eq. 4 above, o is a final shared classification layer. The reference parallel ordering models are defined identically, but with $w_k$ in the same order for both tasks. Note that fitting the parallel model with n samples is equivalent to a single-task model with 2n. In the first experiment, m=128 and $\phi$=I. Although adding depth does not add expressivity in the single-task linear case, it is useful for examining the effects of permuted ordering, and deep linear networks are known to share properties with nonlinear networks (Saxe et al., 2013). In the second experiment, m=16 and $\phi$=ReLU.

Figure 4:
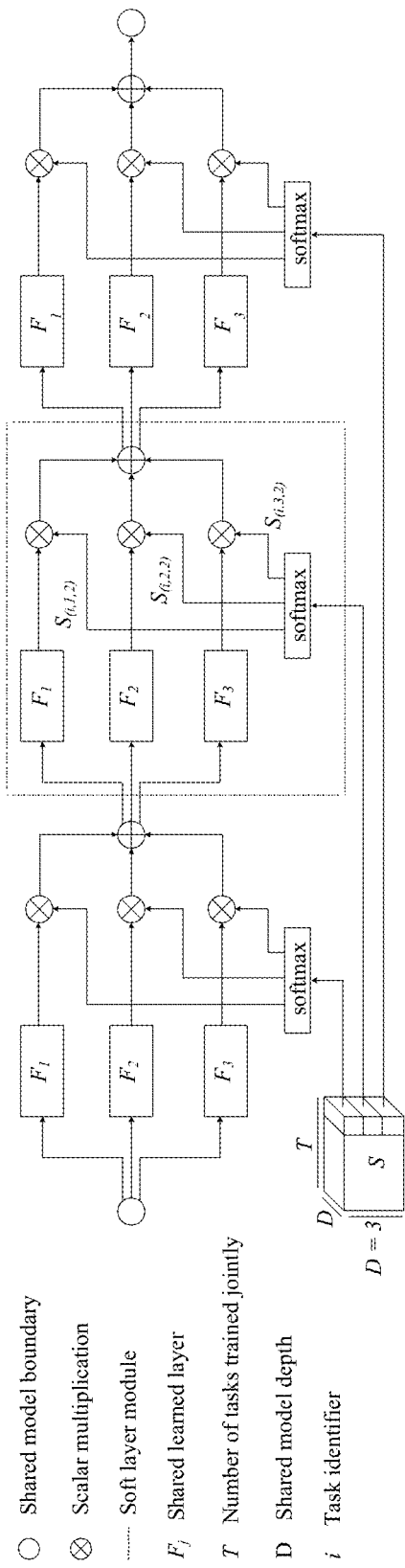
FIG. 4 depicts soft ordering of shared layers.
Figure 5:
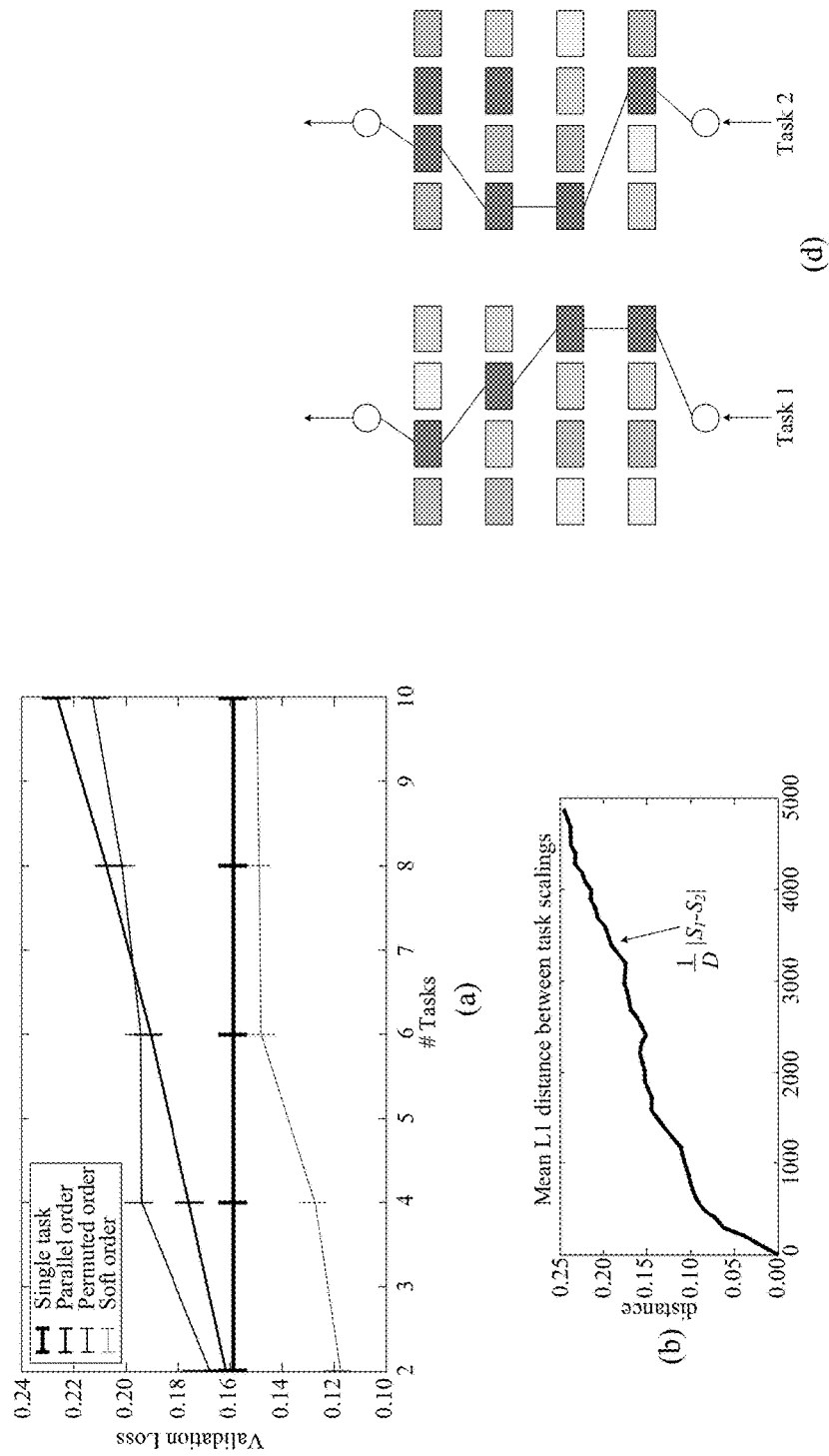
FIGS. 5(a)-(d) show empirical evaluation of soft layer ordering on MNIST tasks.

The results are shown in FIG. 4. Remarkably, in the linear case, permuted ordering of shared layers does not lose accuracy compared to the single-task case. A similar gap in performance is seen in the nonlinear case, indicating that this behavior extends to more powerful models. Thus, the learned permuted layers are able to successfully adapt to their different orderings in different tasks.

Looking at conditions that make this result possible can shed further light on this behavior. For instance, consider T tasks $t_1 \ldots, t_T$ with input and output size both m, and optimal linear solutions $F_1, \ldots, F_T$, respectively. Let $F_1, \ldots, F_T$ be m×m matrices, and suppose there exist matrices $G_1 \ldots G_T$ such that $F_i = G_i G_{(i-1 \mod T)} \forall i$. Then, because the matrix trace is invariant under cyclic permutations, the constraint arises that:

$$tr(F_1) = tr(F_2) = \ldots = tr(F_T) \quad (5)$$

In the case of random matrices induced by the random tasks above, the traces of $F_i$ are all equal in expectation and concentrate well as their dimensionality increases. So, the restrictive effect of Eq. 5 on the expressivity of permuted ordering here is negligible.

3.2(b) Adding a Small Number of Task-Specific Scaling Parameters

Of course, real world tasks are generally much more structured than random ones, so such reliable expressivity of permuted ordering might not always be expected. However, adding a small number of task-specific scaling parameters can help adapt learned layers to particular tasks. This observation has been previously exploited in the parallel ordering setting, for learning task-specific batch normalization scaling parameters (Bilen and Vedaldi, 2017) and controlling communication between columns (Misra et al., 2016). Similarly, in the permuted ordering setting, the constraint induced by Eq. 5 can be reduced by adding task-specific scalars $\{s_i\}_{i=2}^{T}$ such that $F_i = s_i G_i G_{(i+1 \mod T)} \cdots G_{(i-1 \mod T)}$, and $s_1$=1. The constraint given by Eq. 5 then reduces to:

$$tr(F_i/s_i) = tr(F_{i+1}/s_{i+1}) \forall 1 \le i < T \Rightarrow s_{i+1} = s_i (tr^{F_{i+1}}/tr(F_i)) \quad (6)$$

The reduction is defined when $tr(F_i) \ne 0 \forall i \le i < T$. Importantly, the number of task-specific parameters does not depend on m, which is useful for scalability as well as encouraging maximal sharing between tasks. The idea of using a small number of task-specific scaling parameters is incorporated in the soft ordering approach introduced in the next section.

3.2(c) Soft Ordering of Shared Layers

FIG. 4 depicts soft ordering of shared layers. In particular, it shows a sample soft ordering network with three shared layers. Soft ordering (Eq. 7) generalizes Eqs. 2 and 3 by learning a tensor S of task-specific scaling parameters. S is learned jointly with the $F_j$, to allow flexible sharing across tasks and depths. Each $F_j$ in FIG. 4 includes a shared weight layer and a nonlinearity. This architecture enables the learning of layers that are used in different ways at different depths for different tasks.

Permuted ordering tests the parallel ordering assumption, but still fixes an a priori layer ordering for each task before training. Here, a more flexible soft ordering approach is introduced, which allows jointly trained models to learn how layers are applied while simultaneously learning the layers themselves. Consider again a core network of depth $\mathcal{D}$ with layers $W_1, \ldots, W_D$ learned and shared across tasks. The soft ordering model for task $t_i$ is defined as follows:

$$y_i^k = \Sigma_{j=1}^{D} s_{(i,j,k)}(\emptyset_k[w_j(y_i^{k-1})]), \text{ with } \Sigma_{j=1}^{D} s_{(i,j,k)} = 1 \forall (i,k) \quad (7)$$

In Eq. 7, $y_k^0 = \varepsilon_i(x_i)$, $y_i = \mathcal{D}_i(y_i^D)$, and each $s_{(i,j,k)}$ is drawn from S: a tensor of learned scales for each task $t_i$ for each layer $W_j$ at each depth k. FIG. 4 shows an example of a resulting depth three model. Motivated by Section 3.2 and previous work (Misra et al., 2016), S adds only $D^2$ scaling parameters per task, which is notably not a function of the size of any $W_j$. The constraint that all $s_{(i,j,k)}$ sum to 1 for any (i,k) is implemented via softmax, and emphasizes the idea that a soft ordering is what is being learned; in particular, this formulation subsumes any fixed layer ordering $\sigma_i$ by $s_{(i,\sigma i(k),k)} = 1 \forall (i,k)$. S can be learned jointly with the other learnable parameters in the $W_k \varepsilon_i$, and $\mathcal{D}_i$ via backpropagation. In training, all $s_{(i,j,k)}$ are initialized with equal values, to reduce initial bias of layer function across tasks. It is also helpful to apply dropout after each shared layer. Aside from its usual benefits (Srivastava et al., 2014), dropout has been shown to be useful in increasing the generalization capacity of shared representations (Devin et al., 2016). Since the trained layers in Eq. 7 are used for different tasks and in different locations, dropout makes them more robust to supporting different functionalities. These ideas are tested empirically on the MNIST, UCI, Omniglot, and CelebA data sets in the next section.

4. Empirical Evaluation of Soft Layer Ordering

These experiments evaluate soft ordering against fixed ordering MTL and single-task learning. The first experiment applies them to closely related MNIST tasks, the second to "superficially unrelated" UCI tasks, the third to the real-world problem of Omniglot character recognition, and the fourth to large-scale facial attribute recognition. In each experiment, single task, parallel ordering (Eq. 2), permuted ordering (Eq. 3), and soft ordering (Eq. 7) train an equivalent set of core layers. In permuted ordering, the order of layers is randomly generated for each task in each trial. See Section 7 for additional details specific to each experiment.

4.1 Intuitively Related Tasks: MNIST Digit1-Vs.-Digit2 Binary Classification

Binary classification problems derived from the MNIST hand-written digit dataset are a common test bed for evaluating deep learning methods that require multiple tasks, e.g., (Fernando et al., 2017; Kirkpatrick et al., 2017; Yang and Hospedales, 2017). Here, the goal of each task is to distinguish between two distinct randomly selected digits. To evaluate the ability of multitask models to exploit related tasks that have disparate representations, each $\varepsilon_i$ is a random frozen fully-connected ReLU layer with output size 64. There are four core layers, each a fully-connected ReLU layer with 64 units. Each $\mathcal{D}_i$ is an unshared dense layer with a single sigmoid binary classification output.

Results are shown in FIGS. 5(a)-(d). Relative performance of permuted ordering compared to parallel ordering increases with the number of tasks trained jointly (FIG. 5(a)). This result is consistent with the hypothesis that parallel ordering has increased negative effects as the number of tasks increases. In contrast, soft ordering outperforms single-task learning, even at ten tasks, for which MTL has ≈1/10 the parameters of single-task learning. FIGS. 5(a)-(d) show what soft ordering actually learns: The scalings for tasks diverge as layers specialize to different functions for different tasks.

FIGS. 5(a)-(d) show empirical evaluation of soft layer ordering on MNIST tasks. In FIG. 5, (a) is relative performance of permuted compared to parallel ordering improves as the number of tasks increases, while soft order outperforms the other methods for all numbers of tasks. For a representative two-task soft order experiment the layer-wise distance between scalings of the tasks increases by iteration, as shown by (b) in FIG. 5. Further, in FIG. 5, (c) shows that the scalings move towards a hard ordering. Finally, in FIG. 5, the final learned relative scale of each shared layer at each depth for each task is depicted by the shading in (d), with the strongest path drawn, showing that a distinct soft order is learned for each task (○ marks the shared model boundary).

4.2 Superficially Unrelated Tasks: Joint Training of Ten Popular UCI Datasets

The next experiment evaluates the ability of soft ordering to integrate information across a diverse set of "superficially unrelated" tasks. Ten tasks are taken from some of most popular UCI classification data sets (Lichman, 2013). Descriptions of these tasks are given in FIG. 6(a). Inputs and outputs have no a priori shared meaning across tasks. Each $\varepsilon_i$ is a learned fully-connected ReLU layer with output size 32. There are four core layers, each a fully-connected ReLU layer with 32 units. Each $\mathcal{D}_i$ is an unshared dense softmax layer for the given number of classes. The results in FIG. 5(b) show that, while parallel and permuted marginally outperform single-task learning, soft ordering significantly outperforms the other methods. With a flexible layer ordering, the model is eventually able to exploit significant regularities underlying these seemingly disparate domains.

Figure 6:
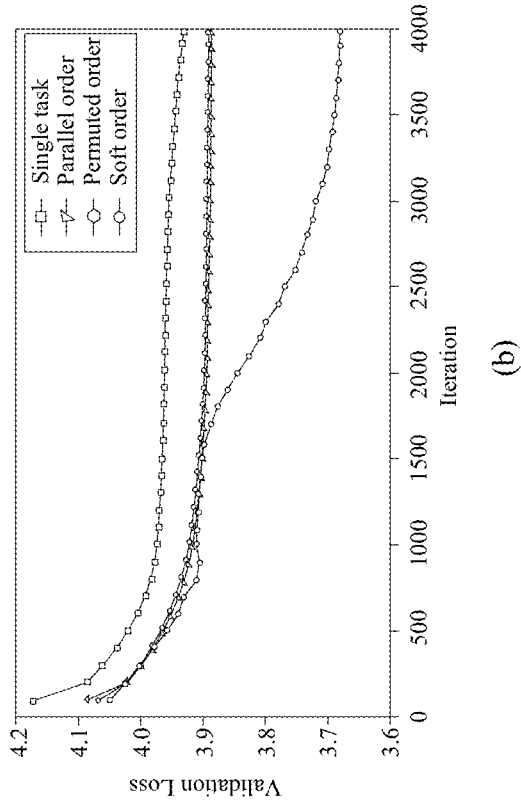
FIGS. 6(a)-(b) illustrate results of joint training on ten popular UCI datasets.

FIGS. 6(a)-(b) illustrate results of joint training on ten popular UCI datasets. In FIG. 6, (a) depicts the ten UCI tasks used in joint training; the varying types of problems and dataset characteristics show the diversity of this set of tasks. In FIG. 6, (b) graphs combined loss over all ten tasks by iteration. Permuted and parallel order yield marginal improvements over single-task learning, while soft order decisively outperforms the other methods.

4.3 Extension to Convolutions: Multi-Alphabet Character Recognition

The Omniglot dataset (Lake et al., 2015) consists of fifty alphabets, each of which induces a different character recognition task. Deep MTL approaches have recently shown promise on this dataset (Yang and Hospedales, 2017). It is a useful benchmark for MTL because the large number of tasks allows analysis of performance as a function of the number of tasks trained jointly, and there is clear intuition for how knowledge of some alphabets will increase the ability to learn others. Omniglot is also a good setting for evaluating the ability of soft ordering to learn how to compose layers in different ways for different tasks: it was developed as a problem with inherent composibility, e.g., similar kinds of strokes are applied in different ways to draw characters from different alphabets (Lake et al., 2015). Consequently, it has been used as a test bed for deep generative models (Rezende et al., 2016). To evaluate performance for a given number of tasks T, a single random ordering of tasks is created, from which the first T tasks are considered. Train/test splits are created in the same way as previous work (Yang and Hospedales, 2017), using 10% or 20% of data for testing.

This experiment is also a scale-up of the previous experiments in that it evaluates soft ordering of convolutional layers. The models are made as close as possible in architecture to previous work (Yang and Hospedales, 2017), while allowing soft ordering to be applied. There are four core layers, each convolutional followed by max pooling. $\varepsilon_i(x_i)=x_i\forall i$, and each $\mathcal{D}_i$ is a fully-connected softmax layer with output size equal to the number of classes. FIGS. 7(a)-(b) depict results which show that soft ordering is able to consistently outperform other deep MTL approaches. The improvements are robust to the number of tasks (FIG. 7(a)) and the amount of training data (FIG. 7(b)), showing that soft ordering is responsible for the improvement, not task complexity or model complexity.

4.4 Large-Scale Application: Facial Attribute Recognition

Although facial attributes are all high-level concepts, they do not intuitively exist at the same level of a shared hierarchy (even one that is learned; Lu et al., 2017). Rather, these concepts are related in multiple subtle and overlapping ways in semantic space. This experiment investigates how a soft ordering approach, as a component in a larger system, can exploit these relationships.

The CelebA dataset consists of ≈200K 178×218 color images, each with binary labels for 40 facial attributes (Liu et al., 2015b). In this experiment, each label defines a task, and parallel and soft order models are based on a ResNet-50 vision model (He et al., 2016), which has also been used in recent state-of-the-art approaches to CelebA (Gunther et al., 2017; He et al., 2017). Let $\varepsilon_i$ be a ResNet-50 model truncated to the final average pooling layer, followed by a linear layer projecting the embedding to size 256. $\varepsilon_i$ is shared across all tasks. There are four core layers, each a dense is a ReLU layer with 256 units. Each $\mathcal{D}_i$ is an unshared dense sigmoid layer. Two models were trained: one with parallel ordering and one with soft ordering. work that used a ResNet-50 vision model showed that using a parallel order multitask model improved test accuracy over single-task learning from 89.63 to 90.42 (He et al., 2017). With our faster training strategy and the added core layers, our parallel ordering model achieves a test accuracy of 89.79. The soft ordering model yields a substantial improvement beyond this to 91.21, demonstrating that soft ordering can add value to a larger deep learning system. Note that previous work has shown that adaptive weighting of task loss (He et al., 2017; Rudd et al., 2016), data augmentation and ensembling (Gunther et al., 2017), and a larger underlying vision model (Lu et al., 2017) each can also yield significant improvements. Aside from soft ordering, none of these improvements alter the multitask topology, so their benefits are expected to be complementary to that of soft ordering demonstrated in this experiment. By coupling them with soft ordering, greater improvements should be possible.

Figure 7:
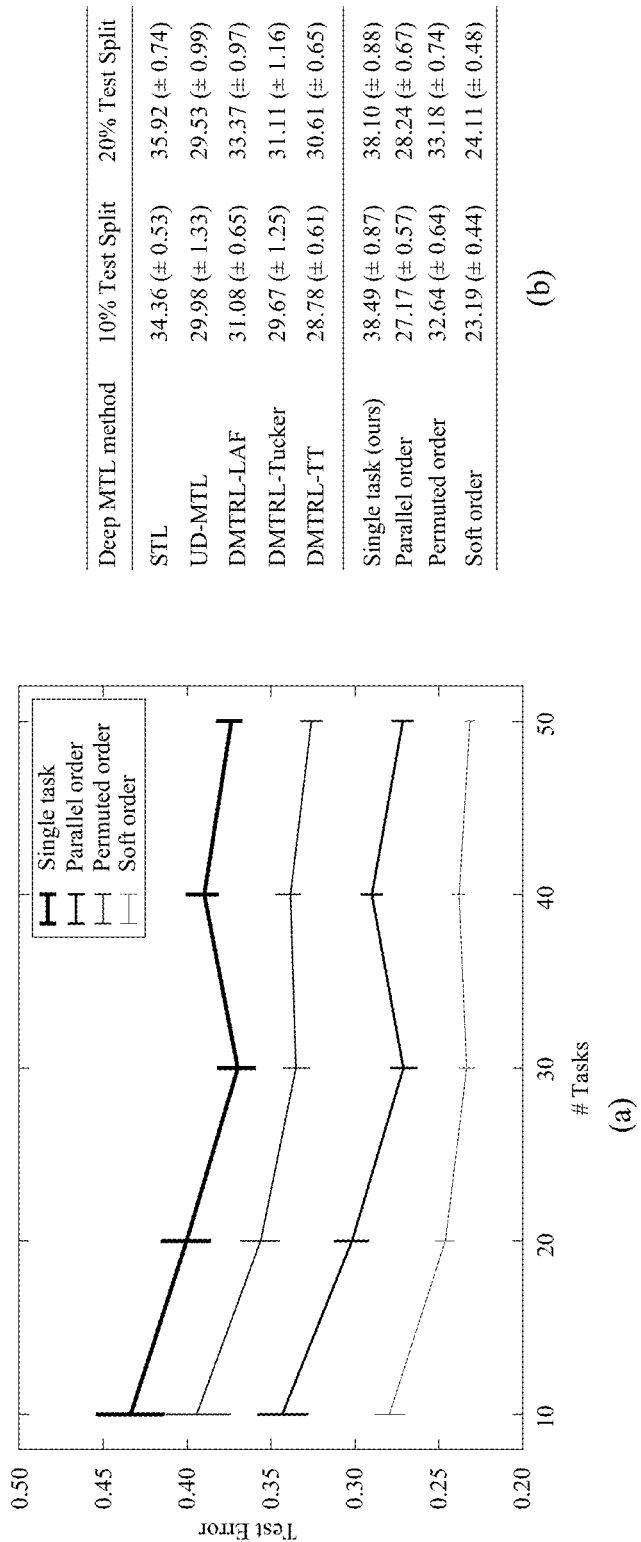
FIGS. 7(a)-(b) show results of soft ordering of layers on Omniglot character recognition task and corresponding dataset.

FIGS. 7(a)-(b) show results of soft ordering of layers on Omniglot character recognition task and corresponding dataset. In FIG. 7, (a) graphs error by number of tasks trained jointly. Soft ordering significantly outperforms single task and both fixed ordering approaches for each number of tasks. In FIG. 7, (b) lists errors with all 50 tasks for different training set sizes. The first five methods are previous deep MTL results (Yang and Hospedales, 2017), which use multitask tensor factorization methods in a shared parallel ordering. Soft ordering significantly outperforms the other approaches, showing the approach scales to real-world tasks requiring specialized components such as convolutional layers.

5. Visualizing the Behavior of Soft Order Layers

The success of soft layer ordering shows that layers learn functional primitives with similar effects in different contexts. To explore this idea qualitatively, the following experiment uses generative visual tasks. The goal of each task is to learn a function $(x,y) \rightarrow v$, where $(x,y)$ is a pixel coordinate and v is a brightness value, all normalized to [0, 1]. Each task is defined by a single image of a "4" drawn from the MNIST dataset; all of its pixels are used as training data. Ten tasks are trained using soft ordering with four shared dense ReLU layers of 100 units each. $\varepsilon_i$ is a linear encoder that is shared across tasks, and $\mathcal{D}_i$ is a global average pooling decoder. Thus, task models are distinguished completely by their learned soft ordering scaling parameters $s_i$. To visualize the behavior of layer l at depth d for task t, the predicted image for task t is generated across varying magnitudes of $s_{(t,l,d)}$. The results for the first two tasks and the first layer are shown in Table 1. Similar function is observed in each of the six contexts, suggesting that the layers indeed learn functional primitives.

Figure 8:
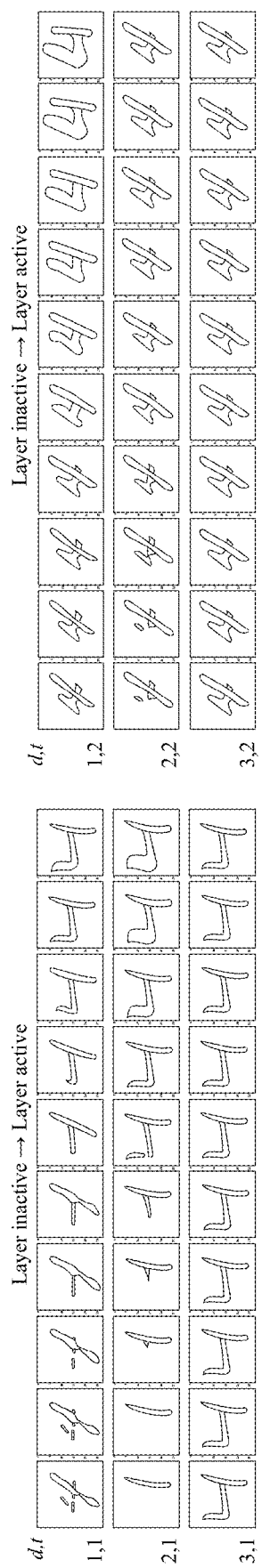
FIG. 8 depicts Table 1 which visualizes the behavior of soft order layers on an image-based character recognition task.

FIG. 8 depicts Table 1 which visualizes the behavior of soft order layers on an image-based character recognition task. For each task t, and at each depth d, the effect of increasing the activation of of this particular layer is to expand the left side of the "4" in a manner appropriate to the functional context (e.g., the magnitude of the effect decreases with depth). Results for other layers are similar, suggesting that the layers implement functional primitives.

6. Some Alternative Implementations

In some implementations, the soft ordering approach here is a relatively small step away from the parallel ordering assumption. In other implementations, to develop more practical and specialized methods, inspiration is taken from recurrent architectures to extend to layers of more general structure and to be applied to training and understanding general functional building blocks.

6.1 Connections to Recurrent Architectures

Eq. 7 is defined recursively with respect to the learned layers shared across tasks. Thus, the soft-ordering architecture can be viewed as a new type of recurrent architecture designed specifically for MTL. From this perspective, FIG. 4 shows an unrolling of a soft layer module: different scaling parameters are applied at different depths when unrolled for different tasks. Since the type of recurrence induced by soft ordering does not require task input or output to be sequential, methods that use recurrence in such a setting are of particular interest (Liang and Hu, 2015; Liao and Poggio, 2016; Pinheiro and Collobert, 2014; Socher et al., 2011; Zamir et al., 2016). Recurrent methods can also be used to reduce the size of S below $O(TD^2)$, e.g., via recurrent hypernetworks (Ha et al., 2016). Finally, Section 4 demonstrated soft ordering where shared learned layers were fully-connected or convolutional; it is also straightforward to extend soft ordering to shared layers with internal recurrence, such as LSTMs (Hochreiter and Schmidhuber, 1997). In this setting, soft ordering can be viewed as inducing a higher-level recurrence.

6.2 Generalizing the Structure of Shared Layers

For clarity, in this paper all core layers in a given setup had the same shape. Of course, it would be useful to have a generalization of soft ordering that could subsume any modern deep architecture with many layers of varying structure. As given by Eq. 7, soft ordering requires the same shape inputs to the element-wise sum at each depth. Reshapes and/or resampling can be added as adapters between tensors of different shape; alternatively, a function other than a sum could be used. For example, instead of learning a weighting across layers at each depth, a probability of applying each module could be learned in a manner similar to adaptive dropout (Ba and Frey, 2013; Li et al., 2016) or a sparsely-gated mixture of experts (Shazeer et al., 2017). Furthermore, the idea of a soft ordering of layers can be extended to soft ordering over modules with more general structure, which may more succinctly capture recurring modularity.

6.3 Training Generalizable Building Blocks

Because they are used in different ways at different locations for different tasks, the shared trained layers in permuted and soft ordering have learned more general functionality than layers trained in a fixed location or for a single task. A natural hypothesis is that they are then more likely to generalize to future unseen tasks, perhaps even without further training. This ability would be especially useful in the small data regime, where the number of trainable parameters should be limited. For example, given a collection of these layers trained on a previous set of tasks, a model for a new task could learn how to apply these building blocks, e.g., by learning a soft order, while keeping their internal parameters fixed. Learning an efficient set of such generalizable layers would then be akin to learning a set of functional primitives. Such functional modularity and repetition is evident in the natural, technological and sociological worlds, so such a set of functional primitives may align well with complex real-world models. This perspective is related to recent work in reusing modules in the parallel ordering setting (Fernando et al., 2017). The different ways in which different tasks learn to use the same set of modules can also help shed light on how tasks are related, especially those that seem superficially disparate (e.g., by extending the analysis performed for FIG. 5(d)), thus assisting in the discovery of real-world regularities.

7. Experimental Details

All experiments are run with the Keras deep learning framework (Chollet et al. (2015), using the Tensorflow backend (Abadi et al., 2015). All experiments use the Adam optimizer with default parameters (Kingma and Ba, 2014).

In each iteration of multitask training, a random batch for each task is processed, and the results are combined across tasks into a single update. Compared to alternating batches between tasks (Luong et al., 2016), processing all tasks simultaneously simplified the training procedure, and led to faster and lower final convergence. When encoders are shared, the inputs of the samples in each batch are the same across tasks. Cross-entropy loss is used for all classification tasks. The overall validation loss is the sum over all per task validation losses.

In each experiment, single task, parallel ordering (Eq. 2), permuted ordering (Eq. 3), and soft ordering (Eq. 7) trained an equivalent set of core layers. In permuted ordering, the order of layers is randomly generated for each task in each trial. Several trials were run for each setup to produce confidence bounds.

7.1 MNIST Experiments

Input pixel values were normalized to be between 0 and 1. The training and test sets for each task were the MNIST train and test sets restricted to the two selected digits. A dropout rate of 0.5 is applied at the output of each core layer.

When randomly selecting the pairs of digits that define a set of tasks, digits were selected without replacement within a task, and with replacement across tasks, so there were 45 possible tasks, and $45^k$ possible sets of tasks of size k.

7.2 UCI Experiments

For all tasks, each input feature is scaled to be between 0 and 1. For each task, training and validation data were created by a random 80-20 split. This split is fixed across trials. A dropout rate of 0.8 is applied at the output of each core layer.

7.3 Omniglot Experiments

To enable soft ordering, the output of all shared layers must have the same shape. For comparability, the models were made as close as possible in architecture to previous work (Yang and Hospedales, 2017), in which models had four sharable layers, three of which were 2D convolutions followed by 2×2 max-pooling, of which two had 3×3 kernels. So, in this experiment, to evaluate soft ordering of convolutional layers, there were four core layers, each a 2D convolutional layer with ReLU activation and kernel size 3×3. Each convolutional layer is followed by a 2×2 max-pooling layer. The number of filters for each convolutional layer is set at 53, which makes the number of total model parameters as close as possible to the reference model. A dropout rate of 0.5 is applied at the output of after each core layer.

The Omniglot dataset consists of 101×101 black-and-white images. There are fifty alphabets of characters and twenty images per character. To be compatible with the shapes of shared layers, the input is zero-padded along the third dimension so that its shape is 101×101×53, i.e., with the first 101×101 slice containing the image data and the remainder zeros. To evaluate approaches on k tasks, a random ordering of the fifty tasks is created and fixed across all trials. In each trial, the first k tasks in this ordering were trained jointly.

7.4 CelebA Experiments

The training, validation, and test splits provided by Liu et al. (2015b) were used. There are ≈160K images for training, ≈20K for validation, and ≈20K for testing. The dataset contains 20 images of each of approximately ≈10K celebrities. The images for a given celebrity occur in only one of the three dataset splits, so models must also generalize to new human identities.

The weights for ResNet-50 were initialized with the pre-trained imagenet weights provided in the Keras framework Chollet et al. (2015). Image preprocessing is done with the default Keras image preprocessing function, including resizing all images to 224×224. A dropout rate of 0.5 is applied at the output of after each core layer. The experiments used a batch size of 32. After validation loss converges via Adam, models are trained with RMSProp with learning rate $1e^{-5}$, which is a similar approach to that used by Gunther et al. (2017).

7.5 Experiments on Visualizing Layer Behavior

To produce the resulting image for a fixed model, the predictions at each pixel locations were generated, denormalized, and mapped back to the pixel coordinate space. The loss used for this experiment is mean squared error (MSE). Since all pixels for a task image are used for training, there is no sense of generalization to unseen data within a task. As a result, no dropout is used in this experiment.

Task models are distinguished completely by their learned soft ordering scaling parameters $s_t$, so the joint model can be viewed as a generative model which generates different 4's for varying values of $s_t$. To visualize the behavior of layer 1 at depth d for task t, the output of the model for task t is visualized while sweeping $s_{(t, 1, d)}$ across [0, 1]. To enable this sweeping while keeping the rest of the model behavior fixed, the softmax for each task at each depth is replaced with a sigmoid activation. Note that due to the global average pooling decoder, altering the weight of a single layer has no observable effect at depth four.

8. Terminology

Module: As used herein, the term "module" refers to a processor that receives information characterizing input data and generates an alternative representation and/or characterization of the input data. A neural network is an example of a module. Other examples of a module include a multi-layer perceptron, a feed-forward neural network, a recursive neural network, a recurrent neural network, a deep neural network, a shallow neural network, a fully-connected neural network, a sparsely-connected neural network, a convolutional neural network that comprises a fully-connected neural network, a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on. Yet other examples of a module include individual components of a convolutional neural network, such as a one-dimensional (1D) convolution module, a two-dimensional (2D) convolution module, a three-dimensional (3D) convolution module, a feature extraction module, a dimensionality reduction module, a pooling module, a subsampling module, a batch normalization module, a concatenation module, a classification module, a regularization module, and so on. In implementations, a module comprises learnable submodules, parameters, and hyperparameters that can be trained by back-propagating the errors using an optimization algorithm. The optimization algorithm can be based on stochastic gradient descent (or other variations of gradient descent like batch gradient descent and mini-batch gradient descent). Some examples of optimization algorithms used by the technology disclosed include Momentum, Nesterov accelerated gradient, Adagrad, Adadelta, RMSprop, and Adam. In implementations, a module is an activation module that applies a non-linearity function. Some examples of non-linearity functions used by the technology disclosed include a sigmoid function, rectified linear units (ReLUs), hyperbolic tangent function, absolute of hyperbolic tangent function, leaky ReLUs (LReLUs), and parametrized ReLUs (PReLUs). In implementations, a module is a classification module. Some examples of classifiers used by the technology disclosed include a multi-class support vector machine (SVM), a Softmax classifier, and a multinomial logistic regressor. Other examples of classifiers used by the technology disclosed include a rule-based classifier. In implementations, a module is a pre-processing module, such as an input module, a normalization module, a patch-extraction module, and a noise-addition module. In implementations, a module is a post-processing module, such as an output module, an estimation module, and a modelling module. Two modules differ in "type" if they differ in at least one submodule, parameter, or hyperparameter. In some implementations, certain modules are fixed topology modules in which a certain set of submodules are not evolved/modified and/or only evolved/modified in certain generations, and only the interconnections and interconnection weights between the submodules are evolved.

In implementations, a module comprises submodules, parameters, and hyperparameters that can be evolved using genetic algorithms (GAs). Modules need not all include a local learning capability, nor need they all include any submodules, parameters, and hyperparameters, which can be altered during operation of the GA. Preferably some, and more preferably all, of the modules are neural networks, which can learn their internal weights and which are responsive to submodules, parameters, and hyperparameters that can be altered during operation of the GA.

Any other conventional or future-developed neural networks or components thereof or used therein, are considered to be modules. Such implementations will be readily apparent to those skilled in the art without departing from the spirit and scope of the technology disclosed.

Submodule: As used herein, the term "submodule" refers to a processing element of a module. For example, in the case of a fully-connected neural network, a submodule is a neuron of the neural network. In another example, a layer of neurons, i.e., a neuron layer, is considered a submodule of the fully-connected neural network module. In other examples, in the case of a convolutional neural network, a kernel, a filter, a feature extractor, an activation function, a pooling operation, a subsampling operation, and a regularization operation, are each considered submodules of the convolutional neural network module. In some implementations, the submodules are considered as modules, and vice-versa.

Supermodule: As used herein, the term "supermodule" refers to a sequence, arrangement, composition, and/or cascades of one or more modules. In a supermodule, the modules are arranged in a sequence from lowest to highest or from nearest to farthest or from beginning to end or from first to last, and the information characterizing the input data is processed through each of the modules in the sequence. In some implementations, certain supermodules are fixed topology supermodules in which a certain set of modules are not evolved/modified and/or only evolved/modified in certain generations, and only the interconnections and interconnection weights between the modules are evolved. Portions of this application refer to a supermodule as a "deep neural network structure".

Blueprint: As used herein, the term "blueprint" refers to a sequence, arrangement, composition, and/or cascades of one or more supermodules. In a blueprint, the supermodules are arranged in a sequence from lowest to highest or from nearest to farthest or from beginning to end or from first to last, and the information characterizing the input data is processed through each of the supermodules in the sequence. In some implementations, certain blueprints are fixed topology blueprints in which a certain set of supermodules are not evolved/modified and/or only evolved/modified in certain generations, and only the interconnections and interconnection weights between the supermodules are evolved.

Subpopulation: As used herein, the term "subpopulation" refers to a cluster of items that are determined to be similar to each other. In some implementations, the term "subpopulation" refers to a cluster of items that are determined to be more similar to each other than to items in other subpopulations. An item can be a blueprint. An item can be a supermodule. An item can be a module. An item can be a submodule. An item can be any combination of blueprints, supermodules, modules, and submodules. Similarity and dissimilarity between items is determined in dependence upon corresponding hyperparameters of the items, such as blueprint hyperparameters, supermodule hyperparameters, and module hyperparameters. In implementations, a subpopulation includes just one item. In some implementations, each subpopulation is stored separately using one or more databases. In other implementations, the subpopulations are stored together as a single population and only logically clustered into separate clusters.

In some implementations, the term "subpopulation" refers to a cluster of items that are determined to have the same "type" such that items in the same cluster have sufficient similar hyperparameters and/or values for certain hyperparameters to qualify as being of the same type, but enough different hyperparameters and/or values for certain hyperparameters to not be considered as the same item. For instance, subpopulations can differ based on the type of supermodules or modules grouped in the subpopulations. In one example, a first subpopulation can include supermodules that are convolutional neural networks with fully-connected neural networks (abbreviated CNN-FCNN) and a second subpopulation can include supermodules that are fully convolutional networks without fully-connected neural networks (abbreviated FCN). Note that, in the first subpopulation, each of the supermodules has the same CNN-FCNN type and at least one different hyperparameter or hyperparameter value that gives them distinguishing identities, while grouping them in the same first subpopulation. Similarly, in the second subpopulation, each of the supermodules has the same FCN type and at least one different hyperparameter or hyperparameter value that gives them distinguishing identities, while grouping them in the same second subpopulation. In one implementation, this is achieved by representing the hyperparameters values for each of the supermodules as vectors, embedding the vectors in a vector space, and clustering the vectors using a clustering algorithm such as Bayesian, K-means, or K-medoids algorithms.

Preferably, a plurality of subpopulations is maintained at the same time. Also preferably, a plurality of subpopulations is created and/or initialized in parallel. In one implementation, the subpopulations are created by speciation. In one implementation, the subpopulations are modified by speciation. Speciation can create new subpopulations, add new items to pre-existing subpopulations, remove pre-existing items from pre-existing subpopulations, move pre-existing items from one pre-existing subpopulation to another pre-existing subpopulation, move pre-existing items from a pre-existing subpopulation to a new subpopulation, and so on. For example, a population of items is divided into subpopulations such that items with similar topologies, i.e., topology hyperparameters, are in the same subpopulation.

In implementations, for clustering items in the same subpopulation, speciation measures a compatibility distance between items in dependence upon a linear combination of the number of excess hyperparameters and disjoint hyperparameters, as well as the average weight differences of matching hyperparameters, including disabled hyperparameters. The compatibility distance measure allows for speciation using a compatibility threshold. An ordered list of subpopulations is maintained, with each subpopulation being identified by a unique identifier (ID). In each generation, items are sequentially placed into the subpopulations. In some implementations, each of the pre-existing subpopulations is represented by a random item inside the subpopulation from the previous generation. In some implementations, a given item (pre-existing or new) in the current generation is placed in the first subpopulation in which it is compatible with the representative item of that subpopulation. This way, subpopulations do not overlap. If the given item is not compatible with any existing subpopulations, a new subpopulation is created with the given item as its representative. Thus, over generations, subpopulations are created, shrunk, augmented, and/or made extinct.

In Parallel: As used herein, "in parallel" or "concurrently" does not require exact simultaneity. It is sufficient if the evaluation of one of the blueprints begins before the evaluation of one of the supermodules completes. It is sufficient if the evaluation of one of the supermodules begins before the evaluation of one of the blueprints completes.

Identification: As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "specify" is used herein to mean the same as "identify".

In Dependence Upon: As used herein, a given signal, event or value is "in dependence upon" a predecessor signal, event or value of the predecessor signal, event or value influenced by the given signal, event or value. If there is an intervening processing element, step or time period, the given signal, event or value can still be "in dependence upon" the predecessor signal, event or value. If the intervening processing element or step combines more than one signal, event or value, the signal output of the processing element or step is considered "in dependence upon" each of the signal, event or value inputs. If the given signal, event or value is the same as the predecessor signal, event or value, this is merely a degenerate case in which the given signal, event or value is still considered to be "in dependence upon" or "dependent on" or "based on" the predecessor signal, event or value. "Responsiveness" of a given signal, event or value upon another signal, event or value is defined similarly.

The hyperparameters further include local topology hyperparameters, which apply to the modules and identify a plurality of submodules of the neural network and interconnections among the submodules. In some implementations, the hyperparameters further include global topology hyperparameters. In other implementations, the hyperparameters further include local topology hyperparameters. Global hyperparameters apply to and/or are configured for an entire supermodule, i.e., they apply uniformly across all the modules of a supermodule. In contrast, local hyperparameters apply to and/or are configured for respective modules in a supermodule, i.e., each module in a supermodule can have its own set of local hyperparameters, which may or may not overlap with a set of local hyperparameters of another module in the supermodule.

The "type" of a module is determined by a set of hyperparameters that identify the module. Two modules differ in "type" if they differ in at least one hyperparameter. For example, a convolution module can have the following local topology hyperparameters—kernel size and number of kernels. A fully-connected neural network module can have the following local topology parameters—number of neurons in a given neuron layer, number of neuron layers in the fully-connected neural network, and interconnections and interconnection weights between the neurons in the neural network. In implementations, two modules that have a same set of hyperparameters, but different values for some of the hyperparameters are considered to belong to the same type.

A sample set of hyperparameters according to one implementation includes the following:

| | Topology | Operational |
|---|---|---|
| Global Hyperparameters | Number of modules, interconnections among the modules, type of interconnections (e.g., residual connections, skip connections), type of modules (e.g., residual blocks). | Learning rate, learning rate decay, momentum, weight initialization, regularization strength, initialization deviation, input initialization deviation, Hue shift, saturation scale, saturation shift, value scale, value shift, pixel dropout, L2 weight decay, and fully-connected layer drop out. |
| Local Hyperparameters | For a fully-connected neural network module: the number of neurons in each neuron layer, the number of neuron layers, and the interconnections among the neurons from one neuron layer to the next. For a convolutional neural network module: kernel size, number of kernels, kernel depth, kernel stride, kernel padding, activation pooling, sub sampling, pooling, and normalization. For an image preprocessing module: image shift, translation, and flipping. | Learning rate, momentum, weight initialization, and fully-connected layer drop out. |
| Blueprint Hyperparameters | Number of supermodules, interconnections among the supermodules, and supermodule subpopulation for each included supermodule. | |

9. System

FIG. 1 is a block diagram 100 that shows various aspects of the technology disclosed, including a model 101 with an encoder 102 and numerous decoders, training data, a trainer, and an initializer.

Encoder 102 is a processor that receives information characterizing input data and generates an alternative representation and/or characterization of the input data, such as an encoding. In particular, encoder 102 is a neural network such as a convolutional neural network (CNN), a multilayer perceptron, a feed-forward neural network, a recursive neural network, a recurrent neural network (RNN), a deep neural network, a shallow neural network, a fully-connected neural network, a sparsely-connected neural network, a convolutional neural network that comprises a fully-connected neural network (FCNN), a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on.

In implementations, encoder 102 includes individual components of a convolutional neural network (CNN), such as a one-dimensional (1D) convolution layer, a two-dimensional (2D) convolution layer, a three-dimensional (3D) convolution layer, a feature extraction layer, a dimensionality reduction layer, a pooling encoder layer, a subsampling layer, a batch normalization layer, a concatenation layer, a classification layer, a regularization layer, and so on.

In implementations, encoder 102 comprises learnable components, parameters, and hyperparameters that can be trained by backpropagating errors using an optimization algorithm. The optimization algorithm can be based on stochastic gradient descent (or other variations of gradient descent like batch gradient descent and mini-batch gradient descent). Some examples of optimization algorithms that can be used to train the encoder 102 are Momentum, Nesterov accelerated gradient, Adagrad, Adadelta, RMSprop, and Adam.

In implementations, encoder 102 includes an activation component that applies a non-linearity function. Some examples of non-linearity functions that can be used by the encoder 102 include a sigmoid function, rectified linear units (ReLUs), hyperbolic tangent function, absolute of hyperbolic tangent function, leaky ReLUs (LReLUs), and parametrized ReLUs (PReLUs).

In some implementations, encoder 102 can include a classification component, though it is not necessary. In preferred implementations, encoder 102 is a convolutional neural network (CNN) without a classification layer such as softmax or sigmoid. Some examples of classifiers that can be used by the encoder 102 include a multi-class support vector machine (SVM), a sigmoid classifier, a softmax classifier, and a multinomial logistic regressor. Other examples of classifiers that can be used by the encoder 102 include a rule-based classifier.

Some examples of the encoder 102 are:
AlexNet
ResNet
Inception (various versions)
WaveNet
PixelCNN
GoogLeNet
ENet
U-Net
BN-NIN
VGG
LeNet
DeepSEA
DeepChem
DeepBind
DeepMotif
FIDDLE
DeepLNC
DeepCpG
DeepCyTOF
SPINDLE In model 101, the encoder 102 produces an output, referred to herein as "encoding", which is fed as input to each of the decoders. When the encoder 102 is a convolutional neural network (CNN), the encoding is convolution data. When the encoder 102 is a recurrent neural network (RNN), the encoding is hidden state data.

Each decoder is a processor that receives, from the encoder 102, information characterizing input data (such as the encoding) and generates an alternative representation and/or characterization of the input data, such as classification scores. In particular, each decoder is a neural network such as a convolutional neural network (CNN), a multilayer perceptron, a feed-forward neural network, a recursive neural network, a recurrent neural network (RNN), a deep neural network, a shallow neural network, a fully-connected neural network, a sparsely-connected neural network, a convolutional neural network that comprises a fully-connected neural network (FCNN), a fully convolutional network without a fully-connected neural network, a deep stacking neural network, a deep belief network, a residual network, echo state network, liquid state machine, highway network, maxout network, long short-term memory (LSTM) network, recursive neural network grammar (RNNG), gated recurrent unit (GRU), pre-trained and frozen neural networks, and so on.

In implementations, each decoder includes individual components of a convolutional neural network (CNN), such as a one-dimensional (1D) convolution layer, a two-dimensional (2D) convolution layer, a three-dimensional (3D) convolution layer, a feature extraction layer, a dimensionality reduction layer, a pooling encoder layer, a subsampling layer, a batch normalization layer, a concatenation layer, a classification layer, a regularization layer, and so on.

In implementations, each decoder comprises learnable components, parameters, and hyperparameters that can be trained by backpropagating errors using an optimization algorithm. The optimization algorithm can be based on stochastic gradient descent (or other variations of gradient descent like batch gradient descent and mini-batch gradient descent). Some examples of optimization algorithms that can be used to train each decoder are Momentum, Nesterov accelerated gradient, Adagrad, Adadelta, RMSprop, and Adam.

In implementations, each decoder includes an activation component that applies a non-linearity function. Some examples of non-linearity functions that can be used by each decoder include a sigmoid function, rectified linear units (ReLUs), hyperbolic tangent function, absolute of hyperbolic tangent function, leaky ReLUs (LReLUs), and parametrized ReLUs (PReLUs).

In implementations, each decoder includes a classification component. Some examples of classifiers that can be used by each decoder include a multi-class support vector machine (SVM), a sigmoid classifier, a softmax classifier, and a multinomial logistic regressor. Other examples of classifiers that can be used by each decoder include a rule-based classifier.

The numerous decoders can all be the same type of neural networks with matching architectures, such as fully-connected neural networks (FCNN) with an ultimate sigmoid or softmax classification layer. In other implementations, they can differ based on the type of the neural networks. In yet other implementations, they can all be the same type of neural networks with different architectures.

FIG. 1 also includes a soft ordering module, which in turn comprise an encoder generator, a feeder, a scaler generator, an accumulator, a forwarder, a controller, and a decoder selector.

10. Some Particular Implementations

We describe a system and various implementations of soft ordering for learning how to apply layers in different ways at different depths for different tasks, while simultaneously learning the layers themselves. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

In one implementation, the technology disclosed presents a neural network-based system. The system is coupled to memory and runs on one or more parallel.

The system comprises an encoder generator. The encoder generator generates an encoder by accessing a set of processing submodules defined for the neural network-based system, constructing clones of the set of processing submodules, and arranging the clones in the encoder in a clone sequence starting from a lowest depth and continuing to a highest depth. The clones in the encoder are shared by a plurality of classification tasks. In some implementations, the clonea have the same hyperparameters.

The system comprises a feeder. The feeder feeds input data for a particular one of the classification tasks to each one of processing submodules in a first clone at the lowest depth in the clone sequence to produce an output encoding from each one of the processing submodules in the first clone.

The system comprises a scaler generator. The scaler generator generates a scaler for the first clone. The scaler applies task-specific, depth-specific, and processing submodule-specific scaling values to respective output encodings of the processing submodules in the first clone to produce a scaled output encoding for each one of the processing submodules in the first clone.

The system comprises an accumulator. The accumulator mixes respective scaled output encodings of the processing submodules in the first clone to produce an accumulated output encoding for the first clone.

The system comprises a forwarder. The forwarder transmits the accumulated output encoding for the first clone as input to each one of processing submodules in a successive clone at a successive depth in the clone sequence.

The system comprises a controller. The controller that iteratively invokes the scaler generator, the accumulator, and the forwarder to, respectively, produce a scaled output encoding for each one of the processing submodules in the successive clone, produce an accumulated output encoding for the successive clone, and transmit the accumulated output encoding for the successive clone as input to each one of processing submodules in another successive clone at another successive depth in the clone sequence until an accumulated output encoding is produced for a final clone at the highest depth in the clone sequence.

The system comprises a decoder selector. The decoder selector selects, from among numerous decoders, a decoder that is specific to the particular one of the classification tasks and transmits the accumulated output encoding produced for the final clone as input to the selected decoder.

The selected decoder processes the accumulated output encoding and produces classification scores for classes defined for the particular one of the classification tasks.

This system implementation and other systems disclosed optionally include one or more of the following features. System can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

In some implementations, the scaler is a three-dimensional tensor that is learned using a gradient-update technique based on backpropagation.

In some implementations, the scaling values are scalar values that augment or diminish respective magnitudes of the output encodings. In one implementation, the scalar values are softmax values that sum to unity. In another implementation, the scalar values are sigmoid values between zero and unity. In yet another implementation, the scalar values are continuous values normalized between a lowest value and a highest value.

In some implementations, the processing submodules in the set have at least one different global topology hyperparameter, global operational hyperparameter, local topology hyperparameter, and/or local operational hyperparameter.

In one implementation, the encoder is a convolutional neural network and the processing submodules are convolution layers interspersed with activation and/or normalization functions. In another implementation, the encoder is a recurrent neural network and the processing submodules are recurrent layers interspersed with activation and/or normalization functions.

In some implementations, each decoder further comprises at least one decoder layer and at least one classification layer. In one implementation, the decoder is a fully-connected neural network and the decoder layer is a fully-connected layer. In another implementation, the classification layer is a sigmoid classifier. In yet another implementation, the classification layer is a softmax classifier.

Other implementations may include a non-transitory computer readable storage medium storing instructions executable by a processor to perform actions of the system described above. Each of the features discussed in the particular implementation section for other implementations apply equally to this implementation. As indicated above, all the other features are not repeated here and should be considered repeated by reference.

In one implementation, the technology disclosed presents a neural network-implemented method of soft ordering.

The method includes generating an encoder by accessing a set of processing submodules defined for a neural network-based system, constructing clones of the set of processing submodules, and arranging the clones in the encoder in a clone sequence starting from a lowest depth and continuing to a highest depth. The clones in the encoder are shared by a plurality of classification tasks. In some implementations, the clones have the same hyperparameters.

The method includes feeding input data for a particular one of the classification tasks to each one of processing submodules in a first clone at the lowest depth in the clone sequence to produce an output encoding from each one of the processing submodules in the first clone.

The method includes generating a scaler for the first clone. The scaler generator generates a scaler for the first clone. The scaler applies task-specific, depth-specific, and processing submodule-specific scaling values to respective output encodings of the processing submodules in the first clone to produce a scaled output encoding for each one of the processing submodules in the first clone.

The method includes mixing respective scaled output encodings of the processing submodules in the first clone to produce an accumulated output encoding for the first clone.

The method includes transmitting the accumulated output encoding for the first clone as input to each one of processing submodules in a successive clone at a successive depth in the clone sequence.

The method includes iterating the scaler generation, the mixing, and the transmitting to, respectively, produce a scaled output encoding for each one of the processing submodules in the successive clone, produce an accumulated output encoding for the successive clone, and transmit the accumulated output encoding for the successive clone as input to each one of processing submodules in another successive clone at another successive depth in the clone sequence until an accumulated output encoding is produced for a final clone at the highest depth in the clone sequence.

The method includes selecting, from among numerous decoders, a decoder that is specific to the particular one of the classification tasks and transmitting the accumulated output encoding produced for the final clone as input to the selected decoder.

The method includes processing the accumulated output encoding through the selected decoder to produce classification scores for classes defined for the particular one of the classification tasks.

Other implementations may include a non-transitory computer readable storage medium (CRM) storing instructions executable by a processor to perform the method described above. Yet another implementation may include a system including memory and one or more processors operable to execute instructions, stored in the memory, to perform the method described above. Each of the features discussed in the particular implementation section for other implementations apply equally to this implementation. As indicated above, all the other features are not repeated here and should be considered repeated by reference.

11. Computer System

Figure 9:
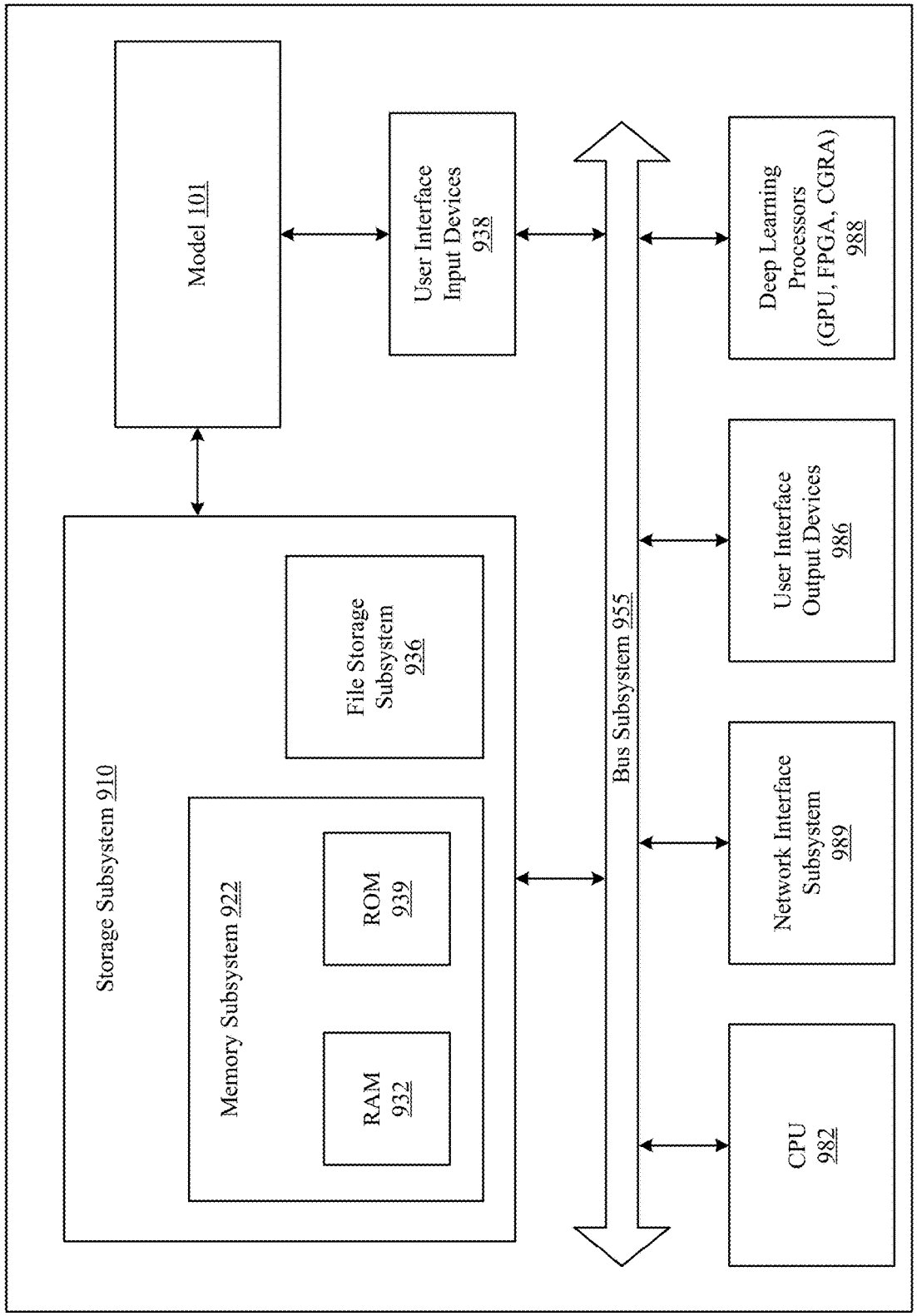
FIG. 9 is a simplified block diagram of a computer system that can be used to implement the technology disclosed.

FIG. 9 is a simplified block diagram of a computer system 900 that can be used to implement the technology disclosed. Computer system 900 includes at least one central processing unit (CPU) 972 that communicates with a number of peripheral devices via bus subsystem 955. These peripheral devices can include a storage subsystem 910 including, for example, memory devices and a file storage subsystem 936, user interface input devices 938, user interface output devices 976, and a network interface subsystem 974. The input and output devices allow user interaction with computer system 900. Network interface subsystem 974 provides an interface to outside networks, including an interface to corresponding interface devices in other computer systems.

In one implementation, the model 101 is communicably linked to the storage subsystem 910 and the user interface input devices 938.

User interface input devices 938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 900.

User interface output devices 976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 900 to the user or to another machine or computer system.

Storage subsystem 910 stores programming and data constructs that provide the functionality of some or all of the modules and methods described herein. Subsystem 978 can be graphics processing units (GPUs) or field-programmable gate arrays (FPGAs).

Memory subsystem 922 used in the storage subsystem 910 can include a number of memories including a main random access memory (RAM) 932 for storage of instructions and data during program execution and a read only memory (ROM) 934 in which fixed instructions are stored. A file storage subsystem 936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 936 in the storage subsystem 910, or in other machines accessible by the processor.

Bus subsystem 955 provides a mechanism for letting the various components and subsystems of computer system 900 communicate with each other as intended. Although bus subsystem 955 is shown schematically as a single bus, alternative implementations of the bus subsystem can use multiple busses.

Computer system 900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 900 depicted in FIG. 9 is intended only as a specific example for purposes of illustrating the preferred embodiments of the present invention. Many other configurations of computer system 900 are possible having more or less components than the computer system depicted in FIG. 9.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A neural network-based system coupled to memory and running on one or more parallel processors, comprising:
   an encoder generator which generates an encoder by accessing a set of processing submodules defined for the neural network-based system, constructing clones of the set of processing submodules, and arranging the clones in the encoder in a clone sequence starting from a lowest depth and continuing to a highest depth, wherein the clones in the encoder are shared by a plurality of classification tasks;
   a feeder which feeds input data for a particular one of each of the plurality of classification tasks to each one of processing submodules in a first clone at the lowest depth in the clone sequence to produce an output encoding from each one of the processing submodules in the first clone;
   a scaler generator which generates a scaler for the first clone, wherein the scaler applies task-specific, depth-specific, and processing submodule-specific scaling values to respective output encodings of the processing submodules in the first clone to produce a scaled output encoding for each one of the processing submodules in the first clone;

an accumulator that mixes respective scaled output encodings of the processing submodules in the first clone to produce an accumulated output encoding for the first clone;

a forwarder that transmits the accumulated output encoding for the first clone as input to each one of processing submodules in a successive clone at a successive depth in the clone sequence;

a controller that iteratively invokes the scaler generator, the accumulator, and the forwarder to, respectively, produce a scaled output encoding for each one of the processing submodules in the successive clone, produce an accumulated output encoding for the successive clone, and transmit the accumulated output encoding for the successive clone as input to each one of processing submodules in another successive clone at another successive depth in the clone sequence until an accumulated output encoding is produced for a final clone at the highest depth in the clone sequence;

a decoder selector which selects, from among numerous decoders, a decoder that is specific to each of a particular one of the classification tasks and transmits the accumulated output encoding produced for the final clone as input to the selected decoder; and the selected decoder which processes the accumulated output encoding and produces classification scores for classes defined for each of the particular one of the classification tasks.

2. The neural network-based system of claim 1, wherein the scaler is a three-dimensional tensor that is learned using a gradient-update technique based on backpropagation.

3. The neural network-based system of claim 1, wherein the scaling values are scalar values that augment or diminish respective magnitudes of the output encodings.

4. The neural network-based system of claim 3, wherein the scalar values are softmax values that sum to unity.

5. The neural network-based system of claim 3, wherein the scalar values are sigmoid values between zero and unity.

6. The neural network-based system of claim 3, wherein the scalar values are continuous values normalized between a lowest value and a highest value.

7. The neural network-based system of claim 1, wherein the processing submodules in the set have at least one different global topology hyperparameter, global operational hyperparameter, local topology hyperparameter, and/or local operational hyperparameter.

8. The neural network-based system of claim 1, wherein the encoder is a convolutional neural network and the processing submodules are convolution layers interspersed with activation and/or normalization functions.

9. The neural network-based system of claim 1, wherein the encoder is a recurrent neural network and the processing submodules are recurrent layers interspersed with activation and/or normalization functions.

10. The neural network-based system of claim 1, wherein each decoder further comprises at least one decoder layer and at least one classification layer.

11. The neural network-based system of claim 10, wherein the decoder is a fully-connected neural network and the decoder layer is a fully-connected layer.

12. The neural network-based system of claim 10, wherein the classification layer is a sigmoid classifier.

13. The neural network-based system of claim 10, wherein the classification layer is a softmax classifier.

14. A neural network-implemented method of soft ordering, including:

generating an encoder by accessing a set of processing submodules defined for a neural network-based model, constructing clones of the set of processing submodules, and arranging the clones in the encoder in a clone sequence starting from a lowest depth and continuing to a highest depth, wherein the clones in the encoder are shared by a plurality of classification tasks;

feeding input data for a particular one of each of the plurality of classification tasks to each one of processing submodules in a first clone at the lowest depth in the clone sequence to produce an output encoding from each one of the processing submodules in the first clone;

generating a scaler for the first clone, wherein the scaler applies task-specific, depth-specific, and processing submodule-specific scaling values to respective output encodings of the processing submodules in the first clone to produce a scaled output encoding for each one of the processing submodules in the first clone;

mixing respective scaled output encodings of the processing submodules in the first clone to produce an accumulated output encoding for the first clone;

transmitting the accumulated output encoding for the first clone as input to each one of processing submodules in a successive clone at a successive depth in the clone sequence;

iterating the scaler generation, the mixing, and the transmitting to, respectively, produce a scaled output encoding for each one of the processing submodules in the successive clone, produce an accumulated output encoding for the successive clone, and transmit the accumulated output encoding for the successive clone as input to each one of processing submodules in another successive clone at another successive depth in the clone sequence until an accumulated output encoding is produced for a final clone at the highest depth in the clone sequence;

selecting, from among numerous decoders, a decoder that is specific to each of a particular one of the classification tasks and transmitting the accumulated output encoding produced for the final clone as input to the selected decoder; and processing the accumulated output encoding through the selected decoder to produce classification scores for classes defined for each of the particular one of the classification tasks.

15. The neural network-implemented method of claim 14, wherein the scaler is a three dimensional tensor that is learned using a gradient-update technique based on backpropagation.

16. The neural network-implemented method of claim 14, wherein the scaling values are scalar values that augment or diminish respective magnitudes of the output encodings.

17. The neural network-implemented method of claim 16, wherein the scalar values are softmax values that sum to unity.

18. The neural network-implemented method of claim 16, wherein the scalar values are sigmoid values between zero and unity.

19. The neural network-implemented method of claim 16, wherein the scalar values are continuous values normalized between a lowest value and a highest value.

20. A non-transitory computer readable storage medium impressed with computer program instructions for neural network-implemented soft ordering, the instructions, when executed on processor, implement a method comprising:

generating an encoder by accessing a set of processing submodules defined for a neural network-based system, constructing clones of the set of processing submodules, and arranging the clones in the encoder in a clone sequence starting from a lowest depth and continuing to a highest depth, wherein the clones in the encoder are shared by a plurality of classification tasks;

feeding input data for a particular one of each of the plurality of classification tasks to each one of processing submodules in a first clone at the lowest depth in the clone sequence to produce an output encoding from each one of the processing submodules in the first clone;

generating a scaler for the first clone, wherein the scaler applies task-specific, depth-specific, and processing submodule-specific scaling values to respective output encodings of the processing submodules in the first clone to produce a scaled output encoding for each one of the processing submodules in the first clone;

mixing respective scaled output encodings of the processing submodules in the first clone to produce an accumulated output encoding for the first clone;

transmitting the accumulated output encoding for the first clone as input to each one of processing submodules in a successive clone at a successive depth in the clone sequence;

iterating the scaler generation, the mixing, and the transmitting to, respectively, produce a scaled output encoding for each one of the processing submodules in the successive clone, produce an accumulated output encoding for the successive clone, and transmit the accumulated output encoding for the successive clone as input to each one of processing submodules in another successive clone at another successive depth in the clone sequence until an accumulated output encoding is produced for a final clone at the highest depth in the clone sequence;

selecting, from among numerous decoders, a decoder that is specific to each of a particular one of the classification tasks and transmitting the accumulated output encoding produced for the final clone as input to the selected decoder; and processing the accumulated output encoding through the selected decoder to produce classification scores for classes defined for each of the particular one of the classification tasks.

* * * * *